United States Patent
Huang et al.

(10) Patent No.: US 11,812,418 B2
(45) Date of Patent: Nov. 7, 2023

(54) TRANSMIT DELAY SENSITIVE UPLINK CONTROL ON SECONDARY CARRIER

(71) Applicant: QUALCOMM Incorporated, San Diego, CA (US)

(72) Inventors: Yi Huang, San Diego, CA (US); Wei Yang, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 189 days.

(21) Appl. No.: 17/372,109

(22) Filed: Jul. 9, 2021

(65) Prior Publication Data

US 2022/0022189 A1 Jan. 20, 2022

Related U.S. Application Data

(60) Provisional application No. 63/052,925, filed on Jul. 16, 2020.

(51) Int. Cl.
*H04L 5/00* (2006.01)
*H04W 72/0453* (2023.01)
*H04W 72/21* (2023.01)

(52) U.S. Cl.
CPC ....... *H04W 72/0453* (2013.01); *H04W 72/21* (2023.01)

(58) Field of Classification Search
CPC .............. H04W 72/0453; H04W 72/21; H04L 5/0053; H04L 5/001
See application file for complete search history.

(56) References Cited

U.S. PATENT DOCUMENTS

| | | | |
|---|---|---|---|
| 2008/0310356 A1 | 12/2008 | Cai et al. | |
| 2009/0034506 A1* | 2/2009 | Wijayanathan | H04B 7/2643 370/345 |
| 2009/0274096 A1* | 11/2009 | Fu | H04W 72/0453 370/328 |
| 2012/0026985 A1* | 2/2012 | Ren | H04L 1/1692 370/336 |
| 2013/0128830 A1* | 5/2013 | Turtinen | H04L 5/0053 370/329 |
| 2015/0305016 A1* | 10/2015 | Dai | H04L 5/0098 370/280 |

(Continued)

FOREIGN PATENT DOCUMENTS

WO  WO-2017171299 A1  10/2017
WO  WO-2019096059 A1  5/2019

OTHER PUBLICATIONS

International Search Report and Written Opinion—PCT/US2021/041244—ISA/EPO—dated Oct. 15, 2021 (206361WO).

*Primary Examiner* — Christine Ng
(74) *Attorney, Agent, or Firm* — Holland & Hart LLP

(57) ABSTRACT

Methods, systems, and devices for wireless communications are described. A user equipment (UE) may select at least one of a primary carrier associated with a physical uplink control channel group or a secondary carrier associated with a physical uplink control channel group for transmitting a physical uplink control channel message to a base station. The UE may transmit, based on selecting at least one of the primary carrier or the secondary carrier, the physical uplink control channel message using at least one of the primary carrier or the secondary carrier.

30 Claims, 19 Drawing Sheets

(56) References Cited

U.S. PATENT DOCUMENTS

| | | |
|---|---|---|
| 2016/0330010 A1* | 11/2016 | Qin ........................ H04L 5/0058 |
| 2017/0331602 A1* | 11/2017 | Hugl ................. H04W 72/1268 |
| 2018/0013519 A1 | 1/2018 | Lee et al. |
| 2018/0167173 A1* | 6/2018 | Guan ..................... H04W 72/21 |
| 2018/0278373 A1* | 9/2018 | Wang .................... H04L 5/0055 |
| 2019/0349177 A1 | 11/2019 | Dinan |
| 2020/0146049 A1* | 5/2020 | Tang ..................... H04L 1/1854 |
| 2020/0305186 A1* | 9/2020 | Alfarhan ............ H04W 72/0446 |
| 2020/0389894 A1* | 12/2020 | Pan ......................... H04L 5/001 |
| 2021/0029650 A1* | 1/2021 | Cirik .................. H04W 52/146 |
| 2021/0067273 A1* | 3/2021 | Lin ....................... H04L 1/1861 |
| 2021/0068114 A1* | 3/2021 | Xu ........................ H04W 72/53 |
| 2021/0144715 A1* | 5/2021 | Gotoh ................... H04L 1/0004 |
| 2022/0007363 A1* | 1/2022 | Wang ................ H04W 36/0069 |
| 2022/0070895 A1* | 3/2022 | Gao ................. H04W 72/1268 |

* cited by examiner

TRANSMIT DELAY SENSITIVE UPLINK CONTROL ON SECONDARY CARRIER

CROSS REFERENCE

The present application for patent claims the benefit of U.S. Provisional Patent Application No. 63/052,925 by HUANG et al., entitled "TRANSMIT DELAY SENSITIVE UPLINK CONTROL ON SECONDARY CARRIER," filed Jul. 16, 2020, assigned to the assignee hereof, and expressly incorporated by reference herein.

FIELD OF TECHNOLOGY

The following relates to wireless communications, including transmit delay sensitive uplink control on secondary carrier.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support transmit delay sensitive uplink control on secondary carrier. Generally, the described techniques provide for a user equipment (UE) to transmit control channel information, such as physical uplink control channel (PUCCH) information, on a secondary carrier of a PUCCH group. For example, the UE may be configured for multi-carrier communications using one or more cells associated with at least a primary carrier (e.g., a primary component carrier (PCC)) and one or more secondary carriers (e.g., secondary component carrier(s) (SCC)(s)). The UE may receive a downlink transmission on one or more of the primary carrier or the secondary carrier of the PUCCH group, e.g., from one or more cells in the PUCCH group. The UE may identify or otherwise determine acknowledgment information (e.g., acknowledgment/negative-acknowledgment (ACK/NACK) information, a channel measurement report associated with the downlink transmission, and the like) related to the downlink transmission. The UE may then select one or more of the primary carrier or the secondary carrier for transmitting feedback to the base station indicating the acknowledgment information. For example, the UE may receive a signal configuring slot patterns for the primary carrier or the secondary carrier or both, where the slot patterns for the different carriers may be selected such that instances of uplink slots are staggered to allow for better ability to transmit information. Accordingly, the UE may select one or more of the primary carrier or the secondary carrier for transmitting a feedback message indicating the acknowledgment information.

A method of wireless communication at a UE is described. The method may include receiving, from a base station, a downlink transmission on at least one of a primary carrier associated with a PUCCH group or a secondary carrier associated with the PUCCH group, determining acknowledgement information associated with the UE decoding the downlink transmission, selecting, based on determining the acknowledgement information, at least one of the primary carrier or the secondary carrier for transmitting feedback to the base station and, and transmitting, based on selecting at least one of the primary carrier or the secondary carrier, a feedback message indicating the acknowledgement information using at least one of the primary carrier or the secondary carrier.

An apparatus for wireless communication at a UE is described. The apparatus may include a processor, memory coupled with the processor, and instructions stored in the memory. The instructions may be executable by the processor to cause the apparatus to receive, from a base station, a downlink transmission on at least one of a primary carrier associated with a PUCCH group or a secondary carrier associated with the PUCCH group, determine acknowledgement information associated with the UE decoding the downlink transmission, select, based on determining the acknowledgement information, at least one of the primary carrier or the secondary carrier for transmitting feedback to the base station and, and transmit, based on selecting at least one of the primary carrier or the secondary carrier, a feedback message indicating the acknowledgement information using at least one of the primary carrier or the secondary carrier.

Another apparatus for wireless communication at a UE is described. The apparatus may include means for receiving, from a base station, a downlink transmission on at least one of a primary carrier associated with a PUCCH group or a secondary carrier associated with the PUCCH group, determining acknowledgement information associated with the UE decoding the downlink transmission, selecting, based on determining the acknowledgement information, at least one of the primary carrier or the secondary carrier for transmitting feedback to the base station and, and transmitting, based on selecting at least one of the primary carrier or the secondary carrier, a feedback message indicating the acknowledgement information using at least one of the primary carrier or the secondary carrier.

A non-transitory computer-readable medium storing code for wireless communication at a UE is described. The code may include instructions executable by a processor to receive, from a base station, a downlink transmission on at least one of a primary carrier associated with a PUCCH group or a secondary carrier associated with the PUCCH group, determine acknowledgement information associated with the UE decoding the downlink transmission, select, based on determining the acknowledgement information, at least one of the primary carrier or the secondary carrier for transmitting feedback to the base station and, and transmit, based on selecting at least one of the primary carrier or the secondary carrier, a feedback message indicating the acknowledgement information using at least one of the primary carrier or the secondary carrier.

Some examples of the method, apparatuses, and non-transitory computer-readable medium described herein may further include operations, features, means, or instructions for receiving a signal configuring a first slot format pattern for the primary carrier and a second slot format pattern for the secondary carrier, where the selecting may be based on the first slot format pattern, the second slot format pattern, or a combination thereof.

In some examples of the method, apparatuses, and non-transitory computer-readable medium described herein, the first slot format pattern and the second slot format pattern together include staggered instances of uplink slots available for transmitting the feedback message in the time domain.

Some examples of the method, apparatuses, and non-transitory computer-readable medium described herein may further include operations, features, means, or instructions for determining that a grant scheduling the downlink transmission may be received a first threshold duration before transmitting the feedback message, and determining that the downlink transmission may be received a second threshold duration before transmitting the feedback message, where transmitting the feedback message may be based on the first threshold duration and the second threshold duration.

Some examples of the method, apparatuses, and non-transitory computer-readable medium described herein may further include operations, features, means, or instructions for transmitting a message indicating a UE capability for transmitting the feedback message using at least one of the primary subcarrier or the secondary subcarrier, where receiving the downlink transmission on at least one of the primary carrier or the secondary carrier may be based on the UE capability.

Some examples of the method, apparatuses, and non-transitory computer-readable medium described herein may further include operations, features, means, or instructions for receiving a signal configuring a first set of resources for transmitting the feedback message on the primary carrier and a second set of resources for transmitting the feedback message on the secondary carrier, where the selecting may be based on the first set of resources and the second set of resources.

Some examples of the method, apparatuses, and non-transitory computer-readable medium described herein may further include operations, features, means, or instructions for determining a resource usage for transmitting the feedback message, and determining available resources in the first set of resources and available resources in the second set of resources, where the selecting may be based on the available resources satisfying the resource usage for transmitting the feedback message.

Some examples of the method, apparatuses, and non-transitory computer-readable medium described herein may further include operations, features, means, or instructions for determining a priority rule associated with transmitting the feedback message on the primary carrier and the secondary carrier, where the selecting may be based on the priority rule and available resources configured for transmitting the feedback message satisfying a resource usage for transmitting the feedback message.

In some examples of the method, apparatuses, and non-transitory computer-readable medium described herein, the priority rule includes a first priority associated with the primary carrier and a second priority associated with the secondary carrier, the first priority being a higher priority than the second priority.

In some examples of the method, apparatuses, and non-transitory computer-readable medium described herein, the priority rule includes a second priority associated with the secondary carrier and a third priority associated with an additional secondary carrier, the second priority being a higher priority than the third priority.

Some examples of the method, apparatuses, and non-transitory computer-readable medium described herein may further include operations, features, means, or instructions for receiving a grant scheduling the downlink transmission and indicating the primary carrier or the secondary carrier for transmitting the feedback message, and the selecting the at least one of the primary carrier or the secondary carrier to transmit the feedback message based on the grant.

Some examples of the method, apparatuses, and non-transitory computer-readable medium described herein may further include operations, features, means, or instructions for receiving a grant activating semi-persistent resources for the downlink transmission and indicating the primary carrier or the secondary carrier for transmitting the feedback message, and the selecting the at least one of the primary carrier or the secondary carrier to transmit the feedback message based on the grant.

Some examples of the method, apparatuses, and non-transitory computer-readable medium described herein may further include operations, features, means, or instructions for receiving a configuration signal indicating semi-persistent resources for the downlink transmission and indicating the primary carrier or the secondary carrier for transmitting the feedback message, and the selecting the at least one of the primary carrier or the secondary carrier to transmit the feedback message based on the configuration signal.

In some examples of the method, apparatuses, and non-transitory computer-readable medium described herein, selecting at least one of the primary carrier or the secondary carrier to transmit the feedback message may include operations, features, means, or instructions for selecting the primary carrier and the secondary carrier for transmitting the feedback message.

In some examples of the method, apparatuses, and non-transitory computer-readable medium described herein, transmitting the feedback message may include operations, features, means, or instructions for transmitting, on the primary carrier, a first feedback message using a first codebook generated based on one or more downlink transmissions received on the primary carrier, and transmitting, on the secondary carrier, a second feedback message using a second codebook generated based on one or more downlink transmissions received on the secondary carrier.

In some examples of the method, apparatuses, and non-transitory computer-readable medium described herein, transmitting the feedback message may include operations, features, means, or instructions for transmitting, on the primary carrier and the secondary carrier, the feedback message using a combined codebook generated based on one or more downlink transmissions received on the primary carrier and the secondary carrier.

Some examples of the method, apparatuses, and non-transitory computer-readable medium described herein may further include operations, features, means, or instructions for determining that an uplink transmission may be scheduled to be transmitted to the base station, determining that a traffic type associated with the uplink transmission may be a traffic type supported by the UE for transmission on the secondary carrier, and selecting the secondary carrier for transmission of the uplink transmission based on the traffic type.

Some examples of the method, apparatuses, and non-transitory computer-readable medium described herein may further include operations, features, means, or instructions for determining that a second uplink transmission may be scheduled to be transmitted to the base station, determining that a second traffic type associated with the second uplink transmission may be a second traffic type supported by the UE for transmission on the primary carrier, and selecting the primary carrier for transmission of the second uplink transmission based on the second traffic type.

In some examples of the method, apparatuses, and non-transitory computer-readable medium described herein, the traffic type associated with the uplink transmission includes an ultra-reliable/low-latency communication (URLLC) traffic type, and where the second traffic type associated with the second uplink transmission includes an enhanced mobile broadband (eMBB) traffic type.

In some examples of the method, apparatuses, and non-transitory computer-readable medium described herein, the acknowledgement information includes at least one of an acknowledgement or a negative acknowledgement.

In some examples of the method, apparatuses, and non-transitory computer-readable medium described herein, the feedback message includes a hybrid automatic repeat/request (HARQ) acknowledgement message, a reference signal measurement report transmission, or both.

In some examples of the method, apparatuses, and non-transitory computer-readable medium described herein, the primary carrier, the secondary carrier, or a combination thereof, each include a time-division duplexing carrier, a frequency-division duplexing carrier, or both.

A method of wireless communication at a base station is described. The method may include transmitting, to a UE, a downlink transmission on at least one of a primary carrier associated with a PUCCH group or a secondary carrier associated with the PUCCH group and receiving, based on a selection of at least one of the primary carrier or the secondary carrier, a feedback message indicating acknowledgement information using at least one of the primary carrier or the secondary carrier.

An apparatus for wireless communication at a base station is described. The apparatus may include a processor, memory coupled with the processor, and instructions stored in the memory. The instructions may be executable by the processor to cause the apparatus to transmit, to a UE, a downlink transmission on at least one of a primary carrier associated with a PUCCH group or a secondary carrier associated with the PUCCH group and receive, based on a selection of at least one of the primary carrier or the secondary carrier, a feedback message indicating acknowledgement information using at least one of the primary carrier or the secondary carrier.

Another apparatus for wireless communication at a base station is described. The apparatus may include means for transmitting, to a UE, a downlink transmission on at least one of a primary carrier associated with a PUCCH group or a secondary carrier associated with the PUCCH group and receiving, based on a selection of at least one of the primary carrier or the secondary carrier, a feedback message indicating acknowledgement information using at least one of the primary carrier or the secondary carrier.

A non-transitory computer-readable medium storing code for wireless communication at a base station is described. The code may include instructions executable by a processor to transmit, to a UE, a downlink transmission on at least one of a primary carrier associated with a PUCCH group or a secondary carrier associated with the PUCCH group and receive, based on a selection of at least one of the primary carrier or the secondary carrier, a feedback message indicating acknowledgement information using at least one of the primary carrier or the secondary carrier.

Some examples of the method, apparatuses, and non-transitory computer-readable medium described herein may further include operations, features, means, or instructions for transmitting a signal configuring a first slot format pattern for the primary carrier and a second slot format pattern for the secondary carrier, where receiving the feedback message from the UE may be based on the first slot format pattern, the second slot format pattern, or a combination thereof.

In some examples of the method, apparatuses, and non-transitory computer-readable medium described herein, the first slot format pattern and the second slot format pattern together include staggered instances of uplink slots available for transmitting the feedback message in the time domain.

Some examples of the method, apparatuses, and non-transitory computer-readable medium described herein may further include operations, features, means, or instructions for transmitting a grant scheduling the downlink transmission a first threshold duration before the UE transmits the feedback message, and transmitting the downlink transmission a second threshold duration before the UE transmits the feedback message, where receiving the feedback message may be based on the first threshold duration and the second threshold duration.

Some examples of the method, apparatuses, and non-transitory computer-readable medium described herein may further include operations, features, means, or instructions for transmitting a signal configuring a first set of resources for transmitting the feedback message on the primary carrier and a second set of resources for transmitting the feedback message on the secondary carrier, where the UE selecting the primary carrier or the secondary carrier may be based on the first set of resources and the second set of resources.

Some examples of the method, apparatuses, and non-transitory computer-readable medium described herein may further include operations, features, means, or instructions for receiving a message indicating a UE capability for transmitting the feedback message using at least one of the primary subcarrier or the secondary subcarrier, where transmitting the downlink transmission on at least one of the primary carrier or the secondary carrier may be based on the UE capability.

Some examples of the method, apparatuses, and non-transitory computer-readable medium described herein may further include operations, features, means, or instructions for determining a priority rule associated with receiving the feedback message on the primary carrier and the secondary carrier, where the UE selecting the primary carrier or the secondary carrier may be based on the priority rule and available resources configured for transmitting the feedback message satisfying a resource usage for transmitting the feedback message.

In some examples of the method, apparatuses, and non-transitory computer-readable medium described herein, the priority rule includes a first priority associated with the primary carrier and a second priority associated with the secondary carrier, the first priority being a higher priority than the second priority.

In some examples of the method, apparatuses, and non-transitory computer-readable medium described herein, the priority rule includes a second priority associated with the secondary carrier and a third priority associated with an additional secondary carrier, the second priority being a higher priority than the third priority.

Some examples of the method, apparatuses, and non-transitory computer-readable medium described herein may further include operations, features, means, or instructions for transmitting a grant scheduling the downlink transmission and indicating the primary carrier or the secondary carrier for transmitting the feedback message, where the grant indicating the primary carrier or the secondary carrier overrides the priority rule for selecting the primary carrier or secondary carrier to transmit the feedback message.

Some examples of the method, apparatuses, and non-transitory computer-readable medium described herein may further include operations, features, means, or instructions for transmitting a grant activating semi-persistent resources for the downlink transmission and indicating the primary carrier or the secondary carrier for transmitting the feedback message, where the grant indicating the primary carrier or the secondary carrier overrides the priority rule for selecting the primary carrier or secondary carrier to transmit the feedback message.

Some examples of the method, apparatuses, and non-transitory computer-readable medium described herein may further include operations, features, means, or instructions for transmitting a configuration signal indicating semi-persistent resources for the downlink transmission and indicating the primary carrier or the secondary carrier for transmitting the feedback message, where the configuration signal indicating the primary carrier or the secondary carrier overrides the priority rule for selecting the primary carrier or secondary carrier to transmit the feedback message.

In some examples of the method, apparatuses, and non-transitory computer-readable medium described herein, receiving the feedback message may include operations, features, means, or instructions for receiving the feedback message on the primary carrier and the secondary carrier.

In some examples of the method, apparatuses, and non-transitory computer-readable medium described herein, receiving the feedback message may include operations, features, means, or instructions for receiving, on the primary carrier, a first feedback message using a first codebook generated based on one or more downlink transmissions transmitted on the primary carrier, and receiving, on the secondary carrier, a second feedback message using a second codebook generated based on one or more downlink transmissions transmitted on the secondary carrier.

In some examples of the method, apparatuses, and non-transitory computer-readable medium described herein, receiving the feedback message may include operations, features, means, or instructions for receiving, on the primary carrier and the secondary carrier, the feedback message using a combined codebook generated based on one or more downlink transmissions transmitted on the primary carrier and the secondary carrier.

Some examples of the method, apparatuses, and non-transitory computer-readable medium described herein may further include operations, features, means, or instructions for determining that an uplink transmission may be scheduled to be transmitted from the UE, determining that a traffic type associated with the uplink transmission may be a traffic type supported by the UE for transmission on the secondary carrier, and receiving the uplink transmission on the secondary carrier based on the traffic type.

Some examples of the method, apparatuses, and non-transitory computer-readable medium described herein may further include operations, features, means, or instructions for determining that a second uplink transmission may be scheduled to be transmitted to the base station, determining that a second traffic type associated with the second uplink transmission may be a second traffic type supported by the UE for transmission on the primary carrier, and receiving the second uplink transmission on the primary carrier based on the second traffic type.

In some examples of the method, apparatuses, and non-transitory computer-readable medium described herein, the traffic type associated with the uplink transmission includes an URLLC traffic type, and where the traffic type associated with the uplink transmission includes an eMBB traffic type.

In some examples of the method, apparatuses, and non-transitory computer-readable medium described herein, the acknowledgement information includes at least one of an acknowledgement or a negative acknowledgement.

In some examples of the method, apparatuses, and non-transitory computer-readable medium described herein, the feedback message includes a hybrid automatic repeat/request acknowledgement message, a reference signal measurement report transmission, or a combination thereof.

In some examples of the method, apparatuses, and non-transitory computer-readable medium described herein, the primary carrier, the secondary carrier, or a combination thereof, each include a time-division duplexing carrier, a frequency-division duplexing carrier, or both.

A method for wireless communication at a UE is described. The method may include selecting at least one of a primary carrier associated with a PUCCH group or a secondary carrier associated with the PUCCH group for transmitting a PUCCH message to a base station and transmitting, based on selecting at least one of the primary carrier or the secondary carrier, the PUCCH message to the base station using at least one of the primary carrier or the secondary carrier.

An apparatus for wireless communication at a UE is described. The apparatus may include a processor, memory coupled with the processor, and instructions stored in the memory. The instructions may be executable by the processor to cause the apparatus to select at least one of a primary carrier associated with a PUCCH group or a secondary carrier associated with the PUCCH group for transmitting a PUCCH message to a base station and transmit, based on selecting at least one of the primary carrier or the secondary carrier, the PUCCH message to the base station using at least one of the primary carrier or the secondary carrier.

Another apparatus for wireless communication at a UE is described. The apparatus may include means for selecting at least one of a primary carrier associated with a PUCCH group or a secondary carrier associated with the PUCCH group for transmitting a PUCCH message to a base station and means for transmitting, based on selecting at least one of the primary carrier or the secondary carrier, the PUCCH message to the base station using at least one of the primary carrier or the secondary carrier.

A non-transitory computer-readable medium storing code for wireless communication at a UE is described. The code may include instructions executable by a processor to select at least one of a primary carrier associated with a PUCCH group or a secondary carrier associated with the PUCCH group for transmitting a PUCCH message to a base station and transmit, based on selecting at least one of the primary carrier or the secondary carrier, the PUCCH message to the base station using at least one of the primary carrier or the secondary carrier.

Some examples of the method, apparatuses, and non-transitory computer-readable medium described herein may further include operations, features, means, or instructions for receiving, from a base station, a downlink transmission on at least one of the primary carrier or the secondary carrier and determining acknowledgement information associated with the UE decoding the downlink transmission, where the selecting may be based on the acknowledgement information.

Some examples of the method, apparatuses, and non-transitory computer-readable medium described herein may further include operations, features, means, or instructions for receiving a grant scheduling the downlink transmission and indicating the primary carrier or the secondary carrier for transmitting the PUCCH message, where the selecting may be based on the grant.

Some examples of the method, apparatuses, and non-transitory computer-readable medium described herein may further include operations, features, means, or instructions for receiving a signal configuring a first slot format pattern for the primary carrier and a second slot format pattern for the secondary carrier, where the selecting may be based on the first slot format pattern, the second slot format pattern, or a combination thereof.

In some examples of the method, apparatuses, and non-transitory computer-readable medium described herein, the first slot format pattern and the second slot format pattern together include staggered instances of uplink slots available for transmitting the PUCCH message in the time domain.

In some examples of the method, apparatuses, and non-transitory computer-readable medium described herein, the staggered instances includes an uplink slot available on the primary carrier, the secondary carrier, or both, during each slot.

Some examples of the method, apparatuses, and non-transitory computer-readable medium described herein may further include operations, features, means, or instructions for transmitting a message indicating a UE capability for transmitting the PUCCH message using at least one of the primary carrier or the secondary carrier, where the selecting the at least one of the primary carrier or the secondary carrier may be based on the UE capability.

Some examples of the method, apparatuses, and non-transitory computer-readable medium described herein may further include operations, features, means, or instructions for receiving a signal configuring a first set of resources for transmitting the PUCCH message on the primary carrier and a second set of resources for transmitting the PUCCH message on the secondary carrier, where the selecting may be based on the first set of resources and the second set of resources.

Some examples of the method, apparatuses, and non-transitory computer-readable medium described herein may further include operations, features, means, or instructions for determining a resource usage for transmitting the PUCCH message and determining available resources in the first set of resources and available resources in the second set of resources, where the selecting may be based on the available resources satisfying the resource usage for transmitting the PUCCH message.

Some examples of the method, apparatuses, and non-transitory computer-readable medium described herein may further include operations, features, means, or instructions for determining a priority rule associated with transmitting the PUCCH message on the primary carrier and the secondary carrier, where the selecting may be based on the priority rule and available resources configured for transmitting the PUCCH message satisfying a resource usage for transmitting the PUCCH message.

In some examples of the method, apparatuses, and non-transitory computer-readable medium described herein, the priority rule includes a first priority associated with the primary carrier and a second priority associated with the secondary carrier, the first priority being a higher priority than the second priority.

In some examples of the method, apparatuses, and non-transitory computer-readable medium described herein, the priority rule includes a second priority associated with the secondary carrier and a third priority associated with an additional secondary carrier, the second priority being a higher priority than the third priority.

Some examples of the method, apparatuses, and non-transitory computer-readable medium described herein may further include operations, features, means, or instructions for receiving a grant activating semi-persistent resources for a downlink transmission and indicating the primary carrier or the secondary carrier for transmitting the PUCCH message, the selecting the at least one of the primary carrier or the secondary carrier to transmit the PUCCH message based on the grant.

Some examples of the method, apparatuses, and non-transitory computer-readable medium described herein may further include operations, features, means, or instructions for receiving a configuration signal indicating semi-persistent resources for a downlink transmission and indicating the primary carrier or the secondary carrier for transmitting the PUCCH message, the selecting the at least one of the primary carrier or the secondary carrier to transmit the PUCCH message based on the configuration signal.

In some examples of the method, apparatuses, and non-transitory computer-readable medium described herein, selecting at least one of the primary carrier or the secondary carrier to transmit the PUCCH message may include operations, features, means, or instructions for selecting the primary carrier and the secondary carrier for transmitting the PUCCH message.

In some examples of the method, apparatuses, and non-transitory computer-readable medium described herein, transmitting the PUCCH message may include operations, features, means, or instructions for transmitting, on the primary carrier, a first PUCCH message using a first codebook generated based on one or more downlink transmissions received on the primary carrier and transmitting, on the secondary carrier, a second PUCCH message using a second codebook generated based on one or more downlink transmissions received on the secondary carrier.

In some examples of the method, apparatuses, and non-transitory computer-readable medium described herein, transmitting the PUCCH message may include operations, features, means, or instructions for transmitting, on the primary carrier and the secondary carrier, the PUCCH message using a combined codebook generated based on one or more downlink transmissions received on the primary carrier and the secondary carrier.

Some examples of the method, apparatuses, and non-transitory computer-readable medium described herein may further include operations, features, means, or instructions for determining that an uplink transmission may be scheduled to be transmitted to the base station, determining that a traffic type associated with the uplink transmission may be a traffic type supported by the UE for transmission on the secondary carrier, and selecting the secondary carrier for transmission of the uplink transmission based on the traffic type.

Some examples of the method, apparatuses, and non-transitory computer-readable medium described herein may further include operations, features, means, or instructions for determining that a second uplink transmission may be scheduled to be transmitted to the base station, determining that a second traffic type associated with the second uplink transmission may be a second traffic type supported by the UE for transmission on the primary carrier, and selecting the primary carrier for transmission of the second uplink transmission based on the second traffic type.

In some examples of the method, apparatuses, and non-transitory computer-readable medium described herein, the traffic type associated with the uplink transmission includes an URLLC traffic type, and the second traffic type associated with the second uplink transmission includes an eMBB traffic type.

In some examples of the method, apparatuses, and non-transitory computer-readable medium described herein, the PUCCH message includes a first HARQ message associated with a dynamically scheduled downlink transmission, a second HARQ message associated with a semi-persistent activated downlink transmission, a first reference signal measurement report transmission associated with a periodic channel state information reference signal (CSI-RS), a second reference signal measurement report associated with an aperiodic channel state information (CSI)-RS, a third reference signal measurement report associated with a semi-persistent CSI-RS, a scheduling request, or a combination thereof.

In some examples of the method, apparatuses, and non-transitory computer-readable medium described herein, the primary carrier, the secondary carrier, or a combination thereof, each include a time-division duplexing carrier, a frequency-division duplexing carrier, or both.

A method for wireless communication at a base station is described. The method may include receiving, from a UE and based on a selection of at least one of a primary carrier associated with a PUCCH group or a secondary carrier associated with the PUCCH group, a PUCCH message using at least one of the primary carrier or the secondary carrier.

An apparatus for wireless communication at a base station is described. The apparatus may include a processor, memory coupled with the processor, and instructions stored in the memory. The instructions may be executable by the processor to cause the apparatus to receive, from a UE and based on a selection of at least one of a primary carrier associated with a PUCCH group or a secondary carrier associated with the PUCCH group, a PUCCH message using at least one of the primary carrier or the secondary carrier.

Another apparatus for wireless communication at a base station is described. The apparatus may include means for receiving, from a UE and based on a selection of at least one of a primary carrier associated with a PUCCH group or a secondary carrier associated with the PUCCH group, a PUCCH message using at least one of the primary carrier or the secondary carrier.

A non-transitory computer-readable medium storing code for wireless communication at a base station is described. The code may include instructions executable by a processor to receive, from a UE and based on a selection of at least one of a primary carrier associated with a PUCCH group or a secondary carrier associated with the PUCCH group, a PUCCH message using at least one of the primary carrier or the secondary carrier.

Some examples of the method, apparatuses, and non-transitory computer-readable medium described herein may further include operations, features, means, or instructions for transmitting, to the UE, a downlink transmission on at least one of the primary carrier or the secondary carrier, where the PUCCH message includes a feedback message indicating acknowledgement information associated with the UE decoding the downlink transmission.

Some examples of the method, apparatuses, and non-transitory computer-readable medium described herein may further include operations, features, means, or instructions for transmitting a grant scheduling the downlink transmission and indicating the primary carrier or the secondary carrier for transmitting the feedback message.

Some examples of the method, apparatuses, and non-transitory computer-readable medium described herein may further include operations, features, means, or instructions for transmitting a signal configuring a first slot format pattern for the primary carrier and a second slot format pattern for the secondary carrier, where receiving the PUCCH message from the UE may be based on the first slot format pattern, the second slot format pattern, or a combination thereof.

In some examples of the method, apparatuses, and non-transitory computer-readable medium described herein, the first slot format pattern and the second slot format pattern together include staggered instances of uplink slots available for transmitting the feedback message in the time domain.

In some examples of the method, apparatuses, and non-transitory computer-readable medium described herein, the staggered instances includes an uplink slot available on the primary carrier, the secondary carrier, or both, during each slot.

DETAILED DESCRIPTION

Figure 1:
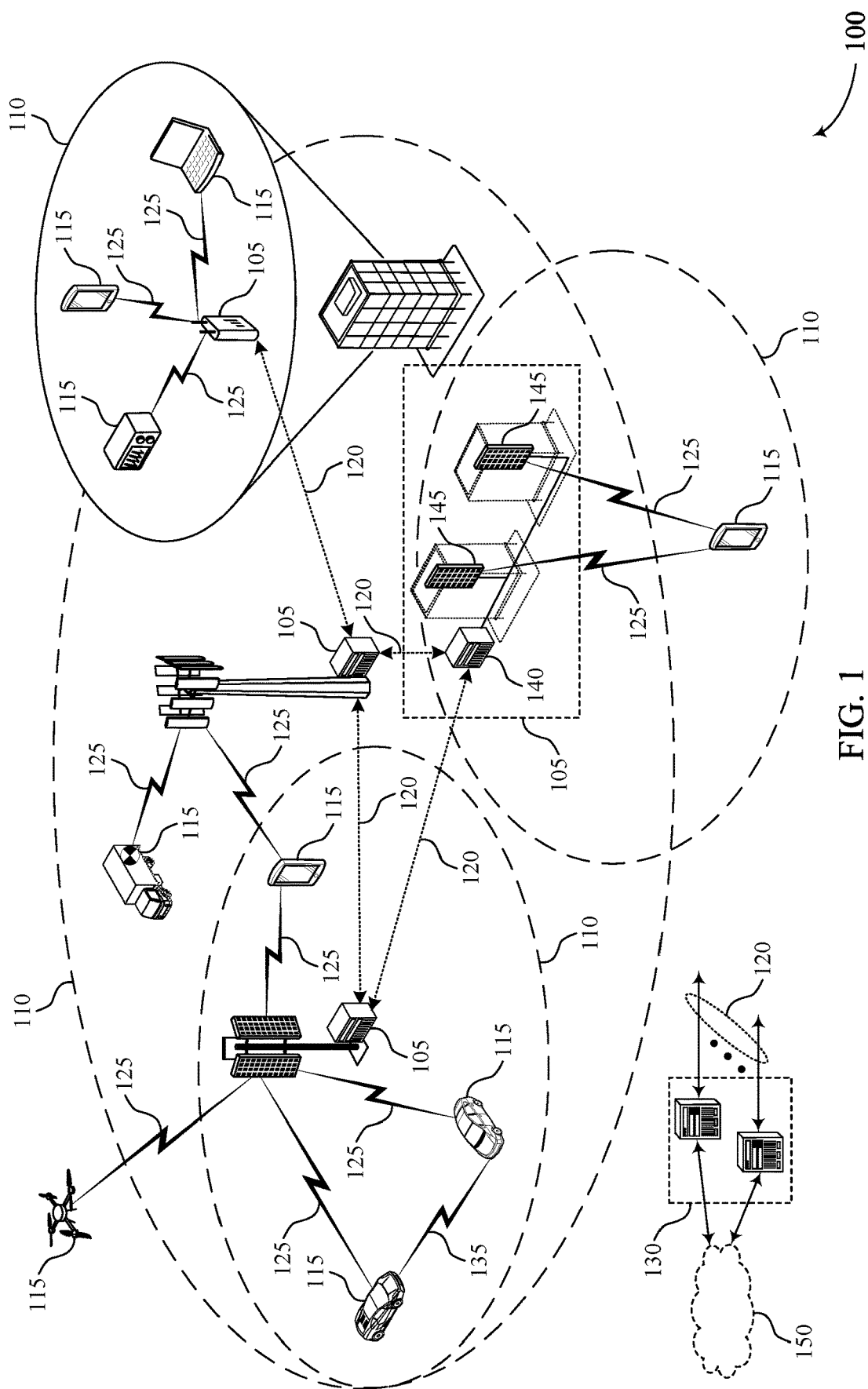
FIG. 1 illustrates an example of a system for wireless communications that supports transmit delay sensitive uplink control on secondary carrier in accordance with aspects of the present disclosure.

A user equipment (UE) may be configured for multi-carrier communications using one or more cells associated with one or more primary carriers (e.g., a primary component carrier (PCC)) and one or more secondary carrier (e.g., secondary component carrier(s) (SCC)(s)). The cells may include, in some example, a physical uplink control channel (PUCCH) group associated with the UE for multi-carrier communications. One cell may be designated as a primary cell (PCell) whereas one or more other cells may be designated as secondary cell. The PCell may be associated with a PCC (e.g., the primary carrier) and each secondary cell may be associated with one or more SCC(s) (e.g., the secondary carrier(s)).

Moreover, some carriers may be configured for time division duplexing (TDD) protocols where each slot (e.g., each transmission opportunity, mini slot, slot, etc.) is designated as either a downlink slot, an uplink slot, or a flexible slot (e.g., may be used for uplink or downlink communications, may include a switching gap for the UE to retune from downlink transmissions to uplink transmissions (or vice versa), and the like). Some carriers may be configured for frequency division duplexing (FDD) protocols where any slot may be used for uplink or downlink communications. In some wireless communications systems, the UE may be limited to transmitting control information, such as PUCCH information (which may otherwise be referenced herein as PUCCH), on the primary carrier. When the primary carrier is a TDD carrier (among other scenarios), however, this may result in a large delay for the PUCCH transmission due to the uplink/downlink/flexible slot configuration or pattern (e.g., an uplink transmissions is not allowed in a downlink slot). Accordingly, aspects of the described techniques provide a mechanism where the UE is able to transmit uplink control information, such as PUCCH information, on a secondary carrier or on both a primary carrier and a secondary carrier.

Aspects of the disclosure are initially described in the context of wireless communications systems. Generally, the described techniques provide for a UE to transmit PUCCH information on a secondary carrier of a PUCCH group. The UE may receive a downlink transmission on one or more of the primary or the one or more secondary carriers from cells of the PUCCH group. The UE may identify or otherwise determine acknowledgment information (e.g., acknowledgment/negative-acknowledgment (ACK/NACK) information, a channel measurement report associated with the downlink transmission, and the like) for the downlink transmission. The UE may then select one or more of the primary carrier or the secondary carrier for transmitting feedback to the base station indicating the acknowledgment information. For example, the UE may receive a signal configuring slot patterns for one or more of the primary carrier or the one or more secondary carriers, where the slot patterns for the different carriers may be selected such that instances of uplink slots are staggered more frequently. Accordingly, the UE may select one or more of the primary carrier or the secondary carrier for transmitting a feedback message (e.g., the PUCCH transmission) indicating the acknowledgment information to the base station (e.g., cell) as opposed to merely transmitting a feedback message solely on a primary carrier.

Aspects of the disclosure are further illustrated by and described with reference to apparatus diagrams, system diagrams, and flowcharts that relate to transmit delay sensitive uplink control on secondary carrier.

FIG. 1 illustrates an example of a wireless communications system 100 that supports transmit delay sensitive uplink control on secondary carrier in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, a downlink transmission on at least one of a primary carrier associated with a physical uplink control channel group or a secondary carrier associated with the physical uplink control channel group. The UE 115 may determine acknowledgement information associated with the UE 115 decoding the downlink transmission. The UE 115 may select, based at least in part on determining the acknowledgement information, at least one of the primary carrier or the secondary carrier for transmitting feedback to the base station. The UE 115 may transmit, based at least in part on selecting at least one of the primary carrier or the secondary carrier, a feedback message indicating the acknowledgement information using at least one of the primary carrier or the secondary carrier.

A base station 105 may transmit, to a UE 115, a downlink transmission on at least one of a primary carrier associated with a physical uplink control channel group or a secondary carrier associated with the physical uplink control channel group. The base station 105 may receive, based at least in part on a selection of at least one of the primary carrier or the secondary carrier, a feedback message indicating acknowledgement information using at least one of the primary carrier or the secondary carrier.

Figure 2:
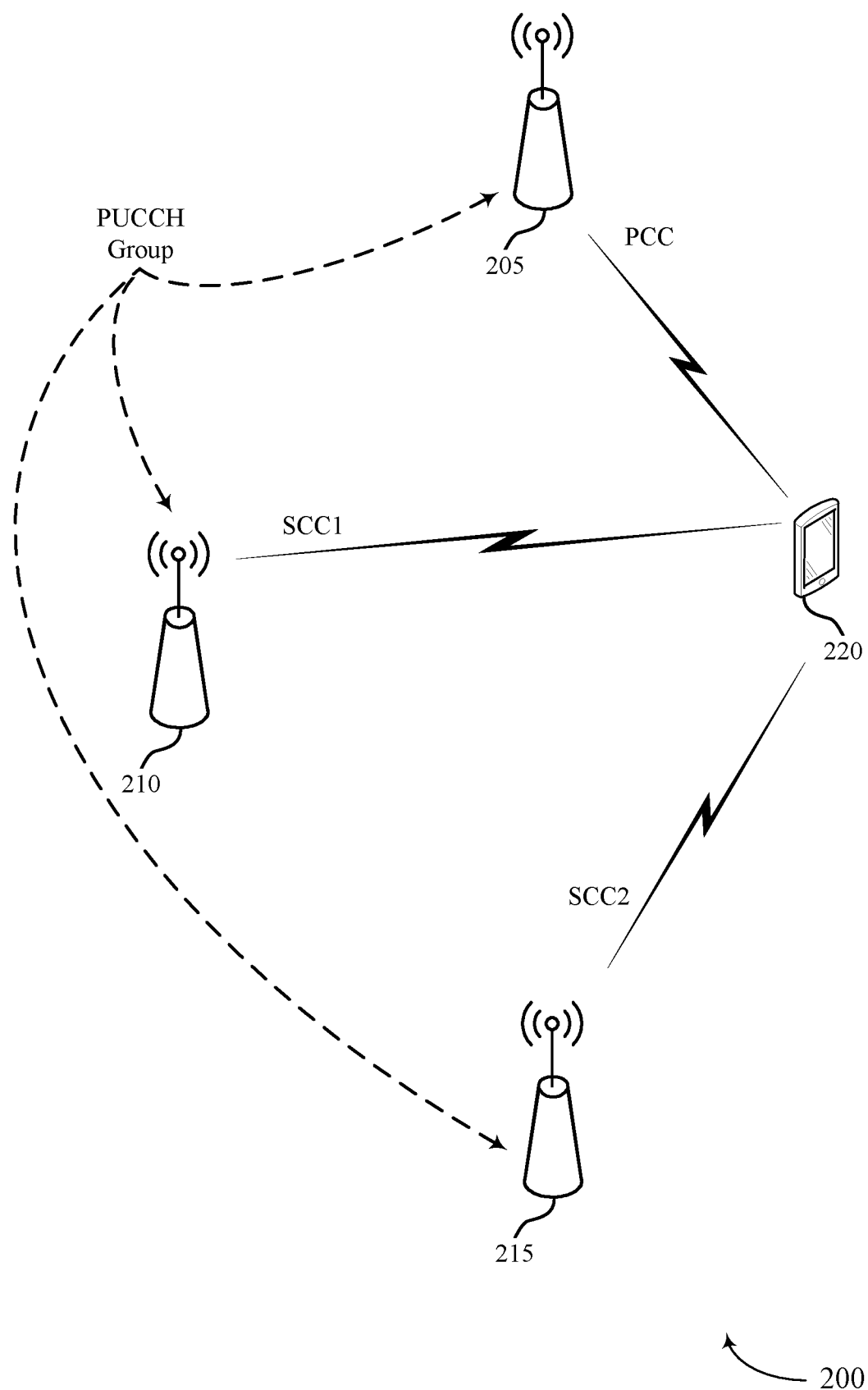
FIG. 2 illustrates an example of a wireless communications system that supports transmit delay sensitive uplink control on secondary carrier in accordance with aspects of the present disclosure.

FIG. 2 illustrates an example of a wireless communications system 200 that supports transmit delay sensitive uplink control on secondary carrier in accordance with aspects of the present disclosure. In some examples, wireless communications system 200 may implement aspects of wireless communications system 100. Wireless communications system 200 may include base station 205, base station 210, base station 215, and/or UE 220, which may be examples of corresponding devices described herein. In some aspects, base station 205, base station 210, base station 215 may constitute or otherwise form a PUCCH group for UE 220 to support multi-carrier communications using at least a primary carrier and one or more secondary carriers.

As discussed above, UE 220 may be configured for multi-carrier communications using one or more cells associated with at least a primary carrier (e.g., a PCC) and secondary carrier(s) (e.g., SCC(s)). The cells may constitute a PUCCH group associated with UE 220 for the multi-carrier communications. In the example illustrated in FIG. 2, base station 205, base station 210, and base station 215 may be considered cells within, and therefore form, the PUCCH group for UE 220. One cell (e.g., base station 205) may be designated as the PCell whereas the other cell(s) (e.g., base station 210, base station 215) may be designated as secondary cell(s). The PCell may be associated with a PCC (e.g., the primary carrier) and each secondary cell may be associated with one or more SCC(s) (e.g., the secondary carrier(s)), e.g., base station 210 may be associated with a first secondary carrier (e.g., SCC1) and base station 215 may be associated with a second or additional secondary carrier (e.g., SCC2).

Moreover, some carriers may be configured for TDD protocols where each slot (e.g., each transmission opportunity, mini slot, slot, etc.) is designated as either a downlink slot, an uplink slot, or a flexible slot (e.g., may be used for uplink or downlink communications, may include a switching gap for the UE to retune from downlink transmissions to uplink transmissions (or vice versa), and the like). Some carriers may be configured for FDD protocols where any slot may be used for uplink or downlink communications. In some wireless communications systems, the UE is only permitted to transmit PUCCH information on the primary carrier. However, when the primary carrier is a TDD carrier, this may result in a large delay for the PUCCH transmission due to the uplink/downlink/flexible slot configuration or pattern (e.g., an uplink transmissions is not allowed in a downlink slot). Accordingly, aspects of the described techniques provide a mechanism where UE 220 is able to transmit PUCCH information on a secondary carrier (e.g., SCC1 and/or SCC2).

For example, UE 220 may receive a downlink transmission (e.g., PDCCH and/or PDSCH) on the primary (e.g., on PCC from base station 205) and/or on secondary carrier(s) (e.g., on SCC1 from base station 210 and/or on SCC2 from base station 215) from cells of the PUCCH group. UE 220 may identify or otherwise determine acknowledgment information (e.g., ACK/NACK information based on whether UE 220 is able to successfully decode the downlink transmission, a channel measurement report associated with the downlink transmission (e.g., a CSI-RS measurement report), and the like) for the downlink transmission. UE 220 may then select the primary carrier (e.g., PCC) and/or the secondary carrier (e.g., SCC1 and/or SCC2) for transmitting feedback to the base station (e.g., base station 205 if UE 220 chooses PCC, base station 210 if UE 220 choses SCC1, and so forth) indicating the acknowledgment information. UE 220 may select the primary carrier and/or the secondary carrier for transmitting a feedback message (e.g., the PUCCH transmission) indicating the acknowledgment information to the base station (depending on which carrier UE 220 chooses for the PUCCH transmission).

In some aspects, this may include, when using TDD protocols for uplink carrier aggregation (e.g., when all CCs in the PUCCH group are TDD carriers), base station 205 (the PCell in this example) may configure a TDD pattern in a staggering/complementary fashion (e.g., in the time domain) such that there are a maximum number of uplink slots supporting uplink transmissions across all CCs. Base station 205 may transmit or otherwise convey the signal configuring the slot format patterns, e.g., in RRC signaling, a MAC CE, DCI, and the like, to UE 220. In one non-limiting example, this may include base station 205 configuring the slot format pattern such that there is at least one carrier available for UE 220 to use for an uplink transmission in each slot. For example, UE 220 may receive a signal configuring slot format patterns for the primary and/or secondary carrier(s), where the slot format patterns for the different carriers are selected such that instances of uplink slots are staggered to occur more frequently.

In the example illustrated in FIG. 2, as one example among others, it is to be understood that various carrier TDD/FDD configurations may be supported. That is, the PCC, SCC1, and/or SCC2 may be TDD carrier(s), FDD carrier(s), or any combination of TDD/FDD carriers. In one example, PCC may be a TDD carrier and SCC1 and/or SCC2 may be FDD carrier(s). In another example, PCC may be a FDD carrier and SCC1 and/or SCC2 may be TDD carriers. In another example, SCC1 may be a TDD carrier and SCC2 may be a FDD carrier, or vice versa. Accordingly, aspects of the described techniques may be applied to any configuration of TDD/FDD carriers in the PUCCH group.

In some aspects, this may include configuring PUCCH resources on each carrier in the PUCCH group to support PUCCH transmissions on a secondary carrier. For example, UE 220 may receive a signal from base station 205 that configures a first set of resources for transmitting the feedback message on the primary carrier (e.g., on PCC), a second set of resources for transmitting the feedback message on the secondary carrier (e.g., SCC1), a third set of resources for transmitting the feedback message on an additional secondary carrier (e.g., SCC2), and so forth. The resources may include time resources, frequency resources, spatial resources, and/or code resources, which are allocated for transmission of PUCCH information on the respective carrier. In some aspects, UE 220 may select the primary (e.g., PCC) or secondary carrier (e.g., SCC1 and/or SCC2) for transmitting the feedback message based on the configured resources as well as the resources needed for transmitting the feedback message. For example, UE 220 may determine the resource usage for transmitting the feedback message and select the primary and/or a secondary carrier for transmitting the feedback message based on the available resources configured for the primary carrier and/or secondary carrier(s).

In some aspects, the indication/determination of which carrier that UE 220 will use for transmitting PUCCH information may be based on a predefined priority rule, may be dynamically indicated (e.g., in DCI), may be semi-statically indicated (e.g., using RRC signaling), and the like. Accordingly, UE 220 may determine the priority rule associated with transmitting the feedback message on the primary carrier and secondary carrier, and select the carrier for transmitting the feedback message based on the priority rule.

Accordingly, UE 220 may be configured (e.g., by base station 205, which is the PCell in this example) with the default rule or the priority rule that, without additional signaling, may correspond to a first priority level associated with PCC, a second priority level associated with SCC1, a third priority level associated with SCC2, and the like. In some non-limiting examples, the first priority level may be a higher priority than the second priority level, the second priority level may be a higher priority than the third priority level, and so forth. In other non-limiting examples, the second priority level, or third priority level, etc., may be the highest priority level. That is, without additional signaling in DCI, RRC, and the like, if PUCCH transmission on the secondary carrier is enabled (e.g., via RRC signaling) for UE 220, in the slot where UE 220 is supposed to feed back HARQ-ACK, UE 220 may feed back the HARQ-ACK on a carrier which has enough uplink OFDM symbols to accommodate the RRC configured PUCCH resource, with the priority of carriers starting from PCC to SCC1 to SCC2 and so forth.

In some examples, however, base station 205 may use signaling to override the priority rule for carrier selection when UE 220 is to transmit PUCCH information. As one example, for dynamically scheduled PDSCH, in the DCI scheduling the PDSCH, base station 205 may add a field to indicate the carrier index that UE 220 will use to feedback HARQ-ACK. Accordingly, UE 220 may receive a grant (e.g., DCI from base station 205) scheduling the downlink transmission (e.g., PDSCH) and indicating the primary carrier (e.g., PCC) or the secondary carrier (e.g., SCC1 and/or SCC2) for transmitting the feedback message. UE 220 may select the primary or secondary carrier based at least in part on the grant (e.g., DCI), e.g., may select the carrier corresponding to the carrier index indicated in the DCI.

In another example, for semi-persistent CSI and/or aperiodic CSI on a PUCCH (e.g., a reference signal measurement report, such as a CSI-RS report), in the DCI activating/scheduling the semi-persistent CSI and/or aperiodic CSI, base station 205 may add a field to indicate the carrier index that UE 220 will use to transmit the CSI report on a PUCCH. For example, UE 220 may receive a grant from base station 205 activating semi-persistent resources for the downlink transmission and indicating the primary carrier (e.g., PCC) or the secondary carrier (e.g., SCC1 and/or SCC2) for transmitting the feedback message. In this example, UE 220 may select the primary carrier and/or secondary carrier to transmit the feedback message based on the grant rule, e.g., may select the carrier corresponding to the carrier index indicated in the DCI.

In another example, for a periodic CSI on a PUCCH and/or ACK/NACK for semi-persistent scheduled (SPS) based PDSCH, in the RRC configuring the PUCCH or SPS, base station 205 may add a field to indicate the carrier index for transmitting periodic CSI on a PUCCH. Accordingly, UE 220 may receive a configuration signal from base station 205 indicating semi-persistent resources for the downlink transmission and indicating the primary carrier (e.g., PCC) or the secondary carrier (e.g., SCC1 and/or SCC2) for transmitting the feedback message. In this example, UE 220 may select the primary carrier and/or secondary carrier to transmit the feedback message based on the configuration signal, e.g., may select the carrier corresponding to the carrier index indicated in the DCI.

In another example, for a scheduling request (SR), UE 220 may identify or otherwise determine that uplink information is available for transmission to the base station 205. Accordingly, the feedback message in some examples may include an SR to the base station 205. In some examples, the SR may request resources (e.g., time resources, frequency resources, spatial resources, etc.) to transmit the uplink information. The UE 220 may select one or both of the primary carrier or the secondary carrier to transmit the feedback message (e.g., the SR via PUCCH) to the base station 205 based on the feedback message in some examples including the SR.

In some aspects, PUCCH transmission on a secondary carrier may be based on UE capability. For example, UE 220 may transmit or otherwise convey a message to base station 205 (e.g., the PCell in this example) indicating a UE capability for transmitting the feedback message using the primary and/or secondary carrier. Base station 205 may enable/disable, enable/disable, etc., PUCCH transmission on the secondary carrier for UE 220, e.g., using RRC signaling, a MAC CE, DCI, and the like.

In some aspects, UE 220 may have uplink transmissions of different traffic types, which may be transmitted on the secondary carrier in some examples. For example, UE 220 may have URLLC, eMBB, etc., traffic for uplink transmission. In this situation, some examples may include allowing the uplink transmission (e.g., PUCCH and/or PUSCH) on a secondary carrier based on the traffic type (e.g., URLLC for delay reduction). In this example, UE 220 may transmit the eMBB transmission on PCC. Accordingly, UE 220 may determine that the uplink transmission (e.g., URLLC) is scheduled to be transmitted to base station 205 and that the uplink transmission has a corresponding traffic type supported for transmission on the secondary carrier. UE 220 may, based on the traffic type, select the secondary carrier for transmission of the uplink transmission (e.g., the URLLC traffic). UE 220 may determine that a second uplink transmission (e.g., eMBB traffic) is to be transmitted to base station 205 and that the second uplink transmission has a corresponding second traffic type supported for transmission on the primary carrier. In this example, UE 220 may select the primary carrier for transmission of the second uplink transmission according to its transmission type.

Figure 3:
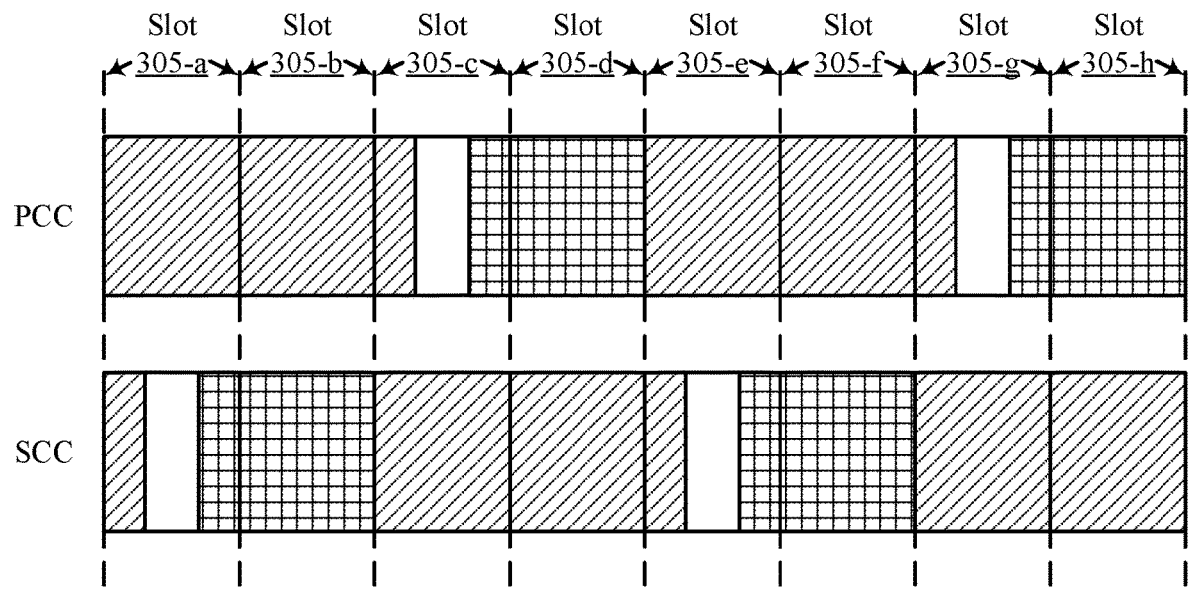
FIG. 3 illustrates an example of a carrier configuration that supports transmit delay sensitive uplink control on secondary carrier in accordance with aspects of the present disclosure.

FIG. 3 illustrates an example of a carrier configuration 300 that supports transmit delay sensitive uplink control on secondary carrier in accordance with aspects of the present disclosure. In some examples, carrier configuration 300 may be implemented by or may implement aspects of wireless communications systems 100 and/or 200. Aspects of carrier configuration 300 may be implemented by base station and/or UE, which may be examples of the corresponding devices described herein. For example, one or more base stations (e.g., cells) may constitute or otherwise form a PUCCH group for a UE that support multi-carrier communications using at least a primary carrier and one or more secondary carriers.

For example, the UE may be configured for multi-carrier communications using one or more cells associated with at least a primary carrier (e.g., a PCC) and secondary carrier(s) (e.g., SCC(s)). The cells may constitute a PUCCH group associated with the UE for the multi-carrier communications. One cell (e.g., one base station) may be designated as the PCell whereas the other cell(s) (e.g., other base station(s)) may be designated as secondary cell(s). The PCell may be associated with a PCC (e.g., the primary carrier) and each secondary cell may be associated with one or more SCC(s) (e.g., the secondary carrier(s)).

Moreover, some carriers may be configured for TDD protocols where each slot 305 (e.g., each transmission opportunity, mini slot, slot, etc.) is designated as either a downlink slot 310, an uplink slot 315, or a switching slot 320 (e.g., may be used for uplink or downlink communications, may include a switching gap for the UE to retune from downlink transmissions to uplink transmissions (or vice versa), and the like). In some wireless communications systems, the UE is only permitted to transmit PUCCH information on the primary carrier. However, when the primary carrier is a TDD carrier, this may result in a large delay for the PUCCH transmission due to the uplink/downlink/flexible slot configuration or pattern (e.g., an uplink transmissions is not allowed in a downlink slot). Accordingly, aspects of the described techniques provide a mechanism where the UE is able to transmit PUCCH information on a secondary carrier (e.g., SCC).

For example, the UE may receive a downlink transmission (e.g., PDCCH and/or PDSCH) during a downlink slot 305 on the primary carrier (e.g., on PCC) and/or on secondary carrier(s) (e.g., on SCC) from cell(s) of the PUCCH group. The UE may identify or otherwise determine acknowledgment information (e.g., ACK/NACK information based on whether the UE is able to successfully decode the downlink transmission, a channel measurement report associated with the downlink transmission (such as a CSI-RS measurement report), and the like) for the downlink transmission. The UE may then select the primary carrier (e.g., PCC) and/or the secondary carrier (e.g., SCC2) for transmitting feedback to the base station indicating the acknowledgment information. Accordingly, the UE may select the primary carrier and/or the secondary carrier for transmitting a feedback message (e.g., the PUCCH transmission) indicating the acknowledgment information to the base station (depending on which carrier the UE chooses for the PUCCH transmission).

In some aspects, this may include, when using TDD protocols for uplink carrier aggregation (e.g., when all CCs in the PUCCH group are TDD carriers), the base station (the PCell in this example) may configure a TDD pattern in a staggering/complementary fashion (e.g., in the time domain) such that there are a maximum number of uplink slots 315 supporting uplink transmissions across all carriers. The base station may transmit or otherwise convey the signal configuring the slot format patterns, e.g., in RRC signaling, a MAC CE, DCI, and the like, to the UE. In one non-limiting example, this may include the base station configuring the slot format pattern such that there is at least one carrier available for the UE to use for an uplink transmission in each slot 305. For example, the UE may receive a signal configuring slot format patterns for the primary and/or secondary carrier(s), where the slot format patterns for the different carriers are selected such that instances of uplink slots 315 are staggered to occur more frequently.

Carrier configuration 300 illustrated in FIG. 3 provides one example of a slot format pattern that may be signaled to the UE in accordance with aspects of the described techniques. The slot format pattern may include a first slot format pattern for the primary carrier and the second slot format pattern for the secondary carrier. For example, the first slot format pattern for the primary carrier (e.g., PCC) may include downlink slots 310 being configured for slot 305-*a*, slot 305-*b*, a first subset of the initial symbols of slot 305-*c*, slot 305-*e*, slot 305-*f*, and a first subset of the initial symbols of slot 305-*g*. The second slot format pattern for the secondary carrier (e.g., SCC) may include downlink slots 310 being configured for a first subset of the initial symbols of slot 305-*a*, slot 305-*c*, slot 305-*d*, a first subset of the initial symbols of slot 305-*e*, slot 305-*g*, and slot 305-*h*.

The first slot format pattern for the primary carrier (e.g., PCC) may include uplink slots 315 being configured for a second subset of the last symbols of slot 305-*c*, slot 305-*d*, a second subset of the last symbols of slot 305-*g*, and slot 305-*h*. The second slot format pattern for the secondary carrier (e.g., SCC) may include uplink slots 315 being configured for a second subset of the last symbols of slot 305-*a*, slot 305-*b*, a second subset of the last symbols of slot 305-*e*, and slot 305-*f*.

The first slot format pattern for the primary carrier (e.g., PCC) may include a switching period 320 configured during slot 305-*c* and slot 305-*g* (e.g., during a third subset of the middle symbols of slot 305-*c* and 305-*g*). The second slot format pattern for the secondary carrier (e.g., SCC) may include a switching period 320 configured during slot 305-*a* and slot 305-*e* (e.g., during a third subset of the middle symbols of slot 305-*a* and 305-*e*).

Accordingly, the first slot format pattern for the primary carrier and the secondary slot format pattern for the secondary carrier together comprise staggering instances of uplink slots 315 for transmitting the feedback message in the time domain. In a non-limiting example illustrated in FIG. 3, the first slot format pattern and second slot format pattern provide instances of uplink slots 315 for transmitting the feedback message in the time domain that occur every other slot 305.

A course, it is to be understood that when additional secondary carrier(s) are provided or otherwise configured within the PUCCH group, additional slot format patterns may be configured for the additional secondary carrier(s) that reduces the instances between uplink slots 315 being configured across the carriers.

Figure 4:
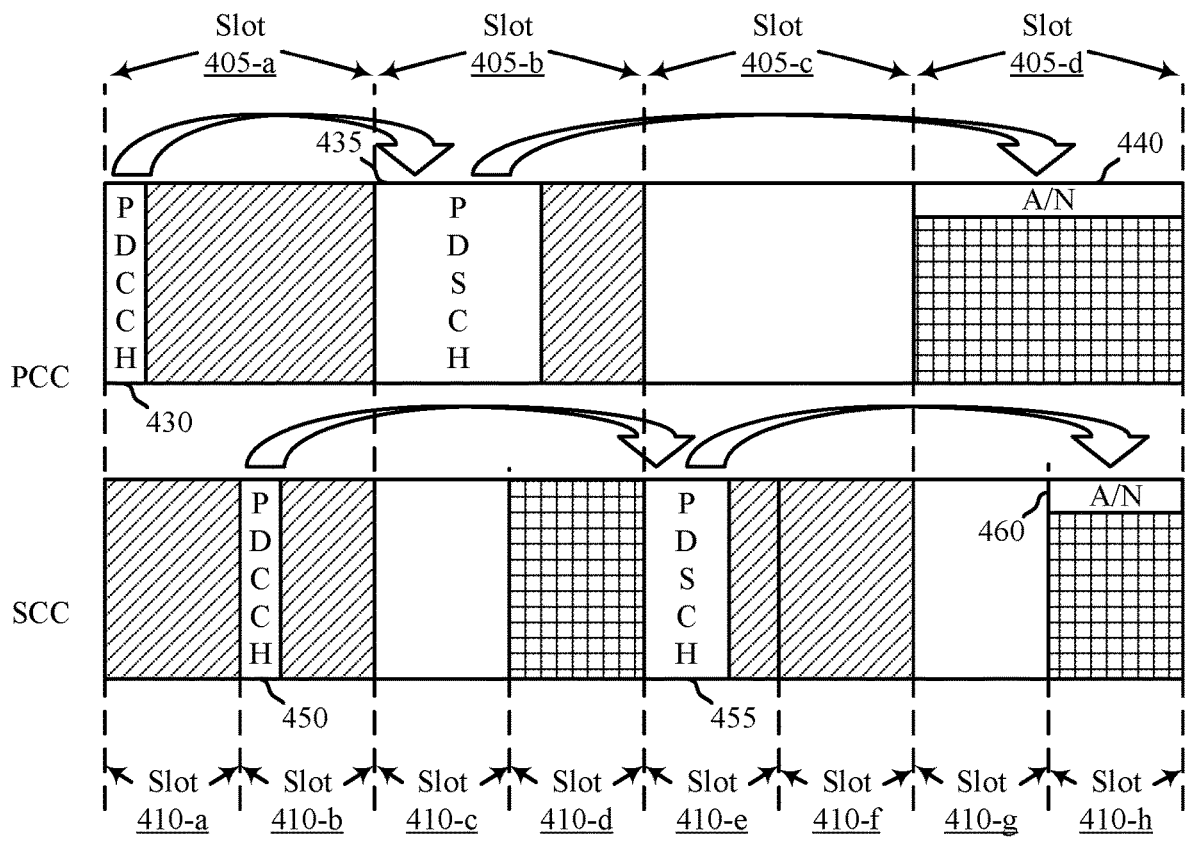
FIG. 4 illustrates an example of a carrier configuration that supports transmit delay sensitive uplink control on secondary carrier in accordance with aspects of the present disclosure.

FIG. 4 illustrates an example of a carrier configuration 400 that supports transmit delay sensitive uplink control on secondary carrier in accordance with aspects of the present disclosure. In some examples, carrier configuration 400 may be implemented by or may implement aspects of wireless communications systems 100 and/or 200 and/or carrier configuration 300. Aspects of carrier configuration 400 may be implemented by a base station and/or UE, which may be examples of the corresponding devices described herein. For example, one or more base stations (e.g., cells) may constitute or otherwise form a PUCCH group for a UE that support multi-carrier communications using at least a primary carrier and one or more secondary carriers.

For example, the UE may be configured for multi-carrier communications using one or more cells associated with at least a primary carrier (e.g., a PCC) and secondary carrier(s) (e.g., SCC(s)). The cells may constitute a PUCCH group associated with the UE for the multi-carrier communications. One cell (e.g., one base station) may be designated as the PCell whereas the other cell(s) (e.g., other base station(s)) may be designated as secondary cell(s). The PCell may be associated with a PCC (e.g., the primary carrier) and each secondary cell may be associated with one or more SCC(s) (e.g., the secondary carrier(s)).

Moreover, some carriers may be configured for TDD protocols where each slot (e.g., each transmission opportunity, mini slot, slot, etc.) is designated as either a downlink slot 415, an uplink slot 420, or a switching period 425 (e.g., may be used for uplink or downlink communications, may include a switching gap for the UE to retune from downlink transmissions to uplink transmissions (or vice versa), and the like). Moreover, some carriers in the PUCCH group may be configured with different sub-carrier spacing (SCS) configurations, which may result in slots having different durations. In the non-limiting example illustrated in FIG. 4, the primary carrier (e.g., PCC) has a SCS providing for a duration of slot 405 on PCC that is twice as long as the duration of slot 410 on the secondary carrier having a different SCS. For example, slot 410-*a* and slot 410-*b* of SCC may have durations that span the same duration as slot 405-*a* of PCC in the time domain, slot 410-*c* and slot 410-*d* of SCC may have durations that span the same duration as slot 405-*b* of PCC in the time domain, slot 410-*e* and slot 410-*f* of SCC may have durations that span the same duration as slot 405-*c* of PCC in the time domain, and slot 410-*g* and slot 410-*h* of SCC may have durations that span the same duration as slot 405-*d* of PCC in the time domain.

In some wireless communications systems, the UE is only permitted to transmit PUCCH information on the primary carrier. However, when the primary carrier is a TDD carrier, this may result in a large delay for the PUCCH transmission due to the uplink/downlink/flexible slot configuration or pattern (e.g., an uplink transmissions is not allowed in a downlink slot). Accordingly, aspects of the described techniques provide a mechanism where the UE is able to transmit PUCCH information on a secondary carrier (e.g., SCC).

For example, the UE may receive a downlink transmission (e.g., PDCCH 430 during slot 405-*a* scheduling PDSCH 435 during slot 405-*b*, and acknowledgement information 440 during slot 405-*d* on PCC and/or PDCCH 450 during slot 410-*b* scheduling PDSCH 455 during slot 410-*e* and acknowledgement information 460 during slot 410-*h*) during one or more downlink slots 415 on the primary carrier (e.g., on PCC) and/or on secondary carrier(s) (e.g., on SCC) from cell(s) of the PUCCH group).

The UE may identify or otherwise determine acknowledgment information 440/460 (e.g., ACK/NACK information based on whether the UE is able to successfully decode the downlink transmission, a channel measurement report associated with the downlink transmission (such as a CSI-RS measurement report), and the like) for the respective downlink transmission(s). The UE may then select the primary carrier (e.g., PCC) and/or the secondary carrier (e.g., SCC) for transmitting feedback to the base station indicating the acknowledgment information 440/460. Accordingly, the UE may select the primary carrier and/or the secondary carrier for transmitting a feedback message (e.g., the PUCCH transmission) indicating the acknowledgment information 440/460 to the base station (depending on which carrier the UE chooses for the PUCCH transmission).

In some aspects, this may result in overlapped uplink slots 420 on the primary carrier and secondary carrier. In this instance, the UE may identify of otherwise select the primary carrier (e.g., PCC) and the secondary carrier (e.g., SCC) for transmitting the feedback message. The UE may transmit the feedback message on both the primary carrier and the secondary carrier. In some aspects, different options may be supported for transmission of the feedback message on the primary carrier and the secondary carrier.

One option may include the UE transmitting HARQ-ACK in parallel on PCC/SCC separately (e.g., not combining the multiple HARQ-ACK codebooks into one). For example, the UE may implement separate codebook construction and downlink assignment indicator (DAI) mechanisms on a per-carrier basis. This may include the UE receiving the downlink transmission (e.g., PDCCH 430 scheduling PDSCH 435 and acknowledgment information 440) on PCC and determining the acknowledgment information 440 for the downlink transmission (e.g., based on whether or not the UE was able to successfully receive and decode PDCCH 430 and/or PDSCH 435). The UE may construct a first codebook for the downlink transmission(s) on PCC and transmit an indication of that codebook in the acknowledgment information 440 provided in the feedback message transmitted during slot 405-*d*. For SCC, this may include the UE receiving the downlink transmission (e.g., PDCCH 450 scheduling PDSCH 455 and acknowledgment information 460) on SCC and determining the acknowledgment information 460 for the downlink transmission (e.g., based on whether or not the UE was able to successfully receive and decode PDCCH 450 and PDSCH 455). The UE may construct a second codebook for the downlink transmission of SCC and transmit an indication of that codebook in the acknowledgment information 460 provided in the feedback message transmitted during slot 410-*h*. Accordingly, UE may transmit a first feedback message using a first codebook generated based at least in part on downlink transmission(s) received on the primary carrier. The UE may transmit a second feedback message using a second codebook generated based at least in part on downlink transmission(s) received on the secondary carrier.

Another option may include, when multiple DCIs/RRCs point to HARQ-ACK transmissions in overlapped uplink slots 420 or switching period 425, the UE may transmit a combined HARQ-ACK codebook in the HARQ-ACK resources following the most recently received DCI. For example, the UE may implement a single codebook construction/DAI mechanism for the downlink transmissions received on PCC and SCC. This may include the UE receiving the downlink transmission (e.g., PDCCH 430 scheduling PDSCH 435 and acknowledgment information 440) on PCC and the downlink transmission (e.g., PDCCH 450 scheduling PDSCH 455 and acknowledgment information 460) on SCC. The UE may determine the acknowledgment information 440/460 for the downlink transmissions (e.g., based on whether or not the UE was able to successfully receive and decode PDCCH 430, PDSCH 435, PDCCH 450, and/or PDSCH 455). The UE may construct a combined codebook for the downlink transmission(s) on PCC and SCC and transmit an indication of that combined codebook in the acknowledgment information 440 provided in the feedback message transmitted during slot 405-*d* and in the acknowledgment information 460 provided in the feedback message transmitted during slot 410-*h*. In this example, acknowledgement information 440 is the same as acknowledgement information 460, e.g., a combined codebook. Accordingly, UE may transmit the feedback message on the primary carrier and the secondary carrier using the combined codebook generated based at least in part on downlink transmission(s) received on the primary carrier and secondary carrier.

Figure 5:
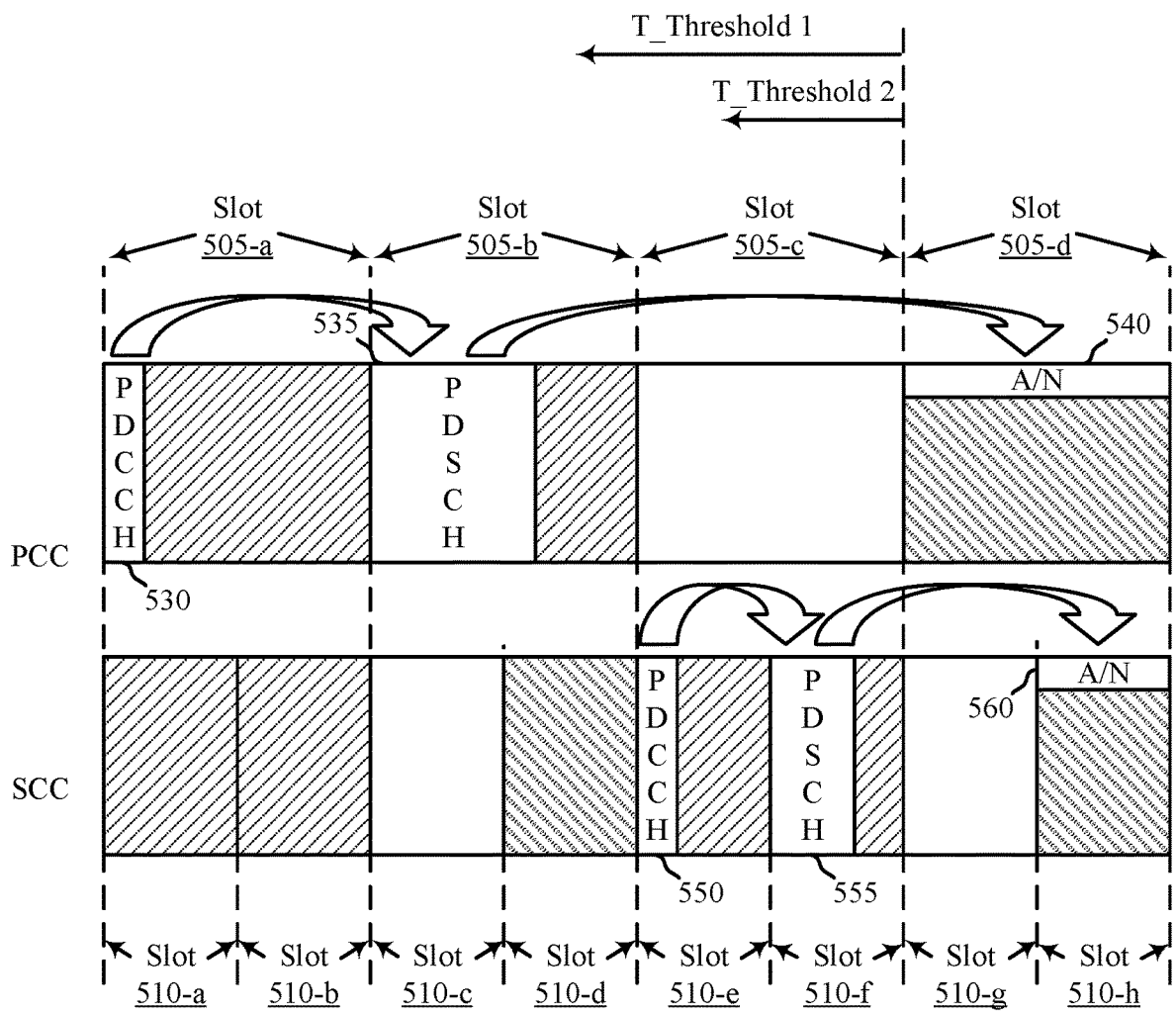
FIG. 5 illustrates an example of a carrier configuration that supports transmit delay sensitive uplink control on secondary carrier in accordance with aspects of the present disclosure.

FIG. 5 illustrates an example of a carrier configuration 500 that supports transmit delay sensitive uplink control on secondary carrier in accordance with aspects of the present disclosure. In some examples, carrier configuration 500 may be implemented by or may implement aspects of wireless communications systems 100 and/or 200 and/or carrier configurations 300 and/or 400. Aspects of carrier configuration 500 may be implemented by a base station and/or UE, which may be examples of the corresponding devices described herein. For example, one or more base stations (e.g., cells) may constitute or otherwise form a PUCCH group for a UE that support multi-carrier communications using at least a primary carrier and one or more secondary carriers.

For example, the UE may be configured for multi-carrier communications using one or more cells associated with at least a primary carrier (e.g., a PCC) and secondary carrier(s) (e.g., SCC(s)). The cells may constitute a PUCCH group associated with the UE for the multi-carrier communications. One cell (e.g., one base station) may be designated as the PCell whereas the other cell(s) (e.g., other base station(s)) may be designated as secondary cell(s). The PCell may be associated with a PCC (e.g., the primary carrier) and each secondary cell may be associated with one or more SCC(s) (e.g., the secondary carrier(s)).

Moreover, some carriers may be configured for TDD protocols where each slot (e.g., each transmission opportunity, mini slot, slot, etc.) is designated as either a downlink slot 515, an uplink slot 520, or a switching period 525 (e.g., may be used for uplink or downlink communications, may include a switching gap for the UE to retune from downlink transmissions to uplink transmissions (or vice versa), and the like). Moreover, some carriers in the PUCCH group may be configured with different sub-carrier spacing (SCS) configurations, which may result in slots having different durations. In the non-limiting example illustrated in FIG. 5, the primary carrier (e.g., PCC) has a SCS providing for a duration of slot 505 on PCC that is twice as long as the duration of slot 510 on the secondary carrier having a different SCS. For example, slot 510-*a* and slot 510-*b* of SCC may have durations that span the same duration as slot 505-*a* of PCC in the time domain, slot 510-*c* and slot 510-*d* of SCC may have durations that span the same duration as slot 505-*b* of PCC in the time domain, slot 510-*e* and slot 510-*f* of SCC may have durations that span the same duration as slot 505-*c* of PCC in the time domain, and slot 510-*g* and slot 510-*h* of SCC may have durations that span the same duration as slot 505-*d* of PCC in the time domain.

In some wireless communications systems, the UE is only permitted to transmit PUCCH information on the primary carrier. However, when the primary carrier is a TDD carrier, this may result in a large delay for the PUCCH transmission due to the uplink/downlink/flexible slot configuration or pattern (e.g., an uplink transmissions is not allowed in a downlink slot). Accordingly, aspects of the described techniques provide a mechanism where the UE is able to transmit PUCCH information on a secondary carrier (e.g., SCC).

For example, the UE may receive a downlink transmission (e.g., PDCCH 530 during slot 505-*a* scheduling PDSCH 535 during slot 505-*b*, and acknowledgement information 540 during slot 505-*d* on PCC and/or PDCCH 550 during slot 510-*e* scheduling PDSCH 555 during slot 510-*f* and acknowledgement information 560 during slot 510-*h*) during one or more downlink slots 515 on the primary carrier (e.g., on PCC) and/or on secondary carrier(s) (e.g., on SCC) from cell(s) of the PUCCH group).

The UE may identify or otherwise determine acknowledgment information 540/560 (e.g., ACK/NACK information based on whether the UE is able to successfully decode the downlink transmission, a channel measurement report associated with the downlink transmission (such as a CSI-RS measurement report), and the like) for the respective downlink transmission(s). The UE may then select the primary carrier (e.g., PCC) and/or the secondary carrier (e.g., SCC) for transmitting feedback to the base station indicating the acknowledgment information 540/560. Accordingly, the UE may select the primary carrier and/or the secondary carrier for transmitting a feedback message (e.g., the PUCCH transmission) indicating the acknowledgment information 540/560 to the base station (depending on which carrier the UE chooses for the PUCCH transmission).

As discussed above, there may be overlapped uplink slots 520 on the primary carrier and secondary carrier. In this instance, the UE may identify of otherwise select the primary carrier (e.g., PCC) and the secondary carrier (e.g., SCC) for transmitting the feedback message. The UE may transmit the feedback message on both the primary carrier and the secondary carrier. One option that may support this technique may include, when multiple DCIS/RRCs point to HARQ-ACK transmissions in overlapped uplink slots 520 or switching period 525, the UE may transmit a combined HARQ-ACK codebook in the HARQ-ACK resources following the most recently received DCI. For example, the UE may implement a single codebook construction/DAI mechanism for the downlink transmissions received on PCC and SCC. Accordingly, the UE may transmit the feedback message on the primary carrier and the secondary carrier using the combined codebook generated based at least in part on downlink transmission(s) received on the primary carrier and secondary carrier.

In some aspects, construction of the combined codebook may take a sufficient time for processing such that various time thresholds may be configured for the downlink transmissions and corresponding acknowledgment information 540 and/or 560 on the PCC and SCC, respectively. This may allow the UE sufficient turnaround time to combine the HARQ-ACK codebooks for the downlink transmissions received on PCC and SCC and switch to the carrier following the last received DCI. In this instance, a first threshold may be defined (T_Threshold 1) in relation to the last received DCI before the first OFDM symbol in the overlapped uplink slots 520 (e.g., ACK/NACK resources, which correspond to the first OFDM symbols of slot 505-d on PCC). That is, the grant (e.g., DCI conveyed in PDCCH 530 and/or PDCCH 550) scheduling the downlink transmission (e.g., PDSCH 535 and/or PDSCH 555, respectively) may be received a first threshold duration before transmitting the feedback message. In the example illustrated in FIG. 5, the grant (e.g., PDCCH 530) received on PCC does not satisfy the first threshold duration (e.g., T_Threshold 1) before transmitting acknowledgment information 540, but the grant (e.g., PDCCH 550) received on SCC does satisfy the first threshold duration (e.g., T_Threshold 1) before transmitting acknowledgment information 560.

Additionally, a second threshold may be defined (e.g., T_Threshold 2) in relation to the last received PDSCH and the first OFDM symbol in the overlapped uplink slots 520. That is, the downlink transmission (e.g., PDSCH 535 and/or PDSCH 555) scheduled by the grants (e.g., PDCCH 530 and/or PDCCH 550, respectively) may be received a second threshold duration before transmitting the feedback message (e.g., acknowledgement information 560). In the example illustrated in FIG. 5, the downlink transmission (e.g., PDSCH 535) received on PCC does not satisfy the second threshold duration (e.g., T_Threshold 2) before transmitting acknowledgment information 540, but the downlink transmission (e.g., PDSCH 555) received on SCC does satisfy the second threshold duration (e.g., T_Threshold 2) before transmitting acknowledgment information 560.

Accordingly, aspects of the described techniques may support the PUCCH group being configured such that the first threshold duration (e.g., T_Threshold 1) and the second duration (e.g., T_Threshold 2) are considered when scheduling downlink transmissions to the UE on PCC and/or SCC.

Figure 6:
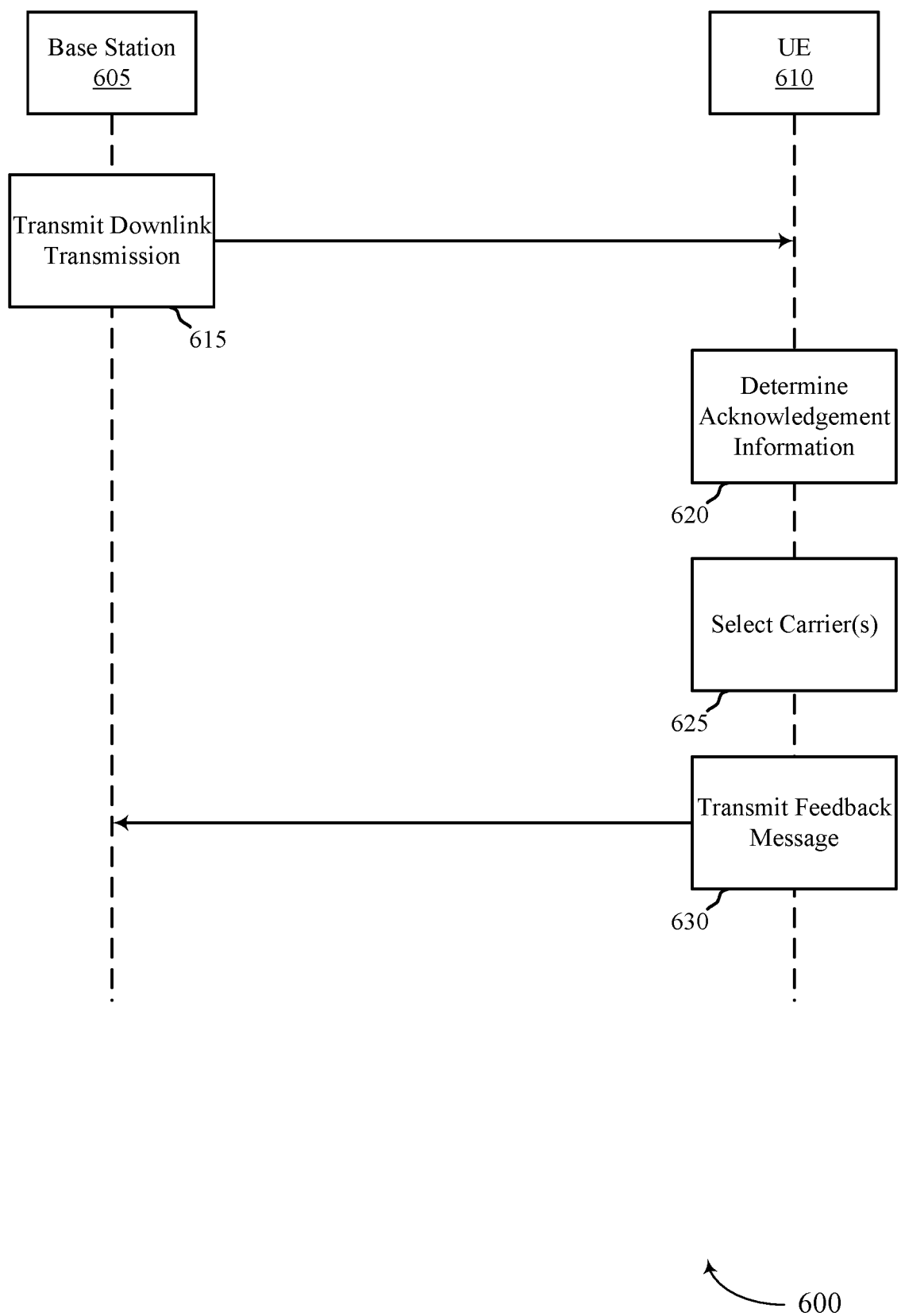
FIG. 6 illustrates an example of a process that supports transmit delay sensitive uplink control on secondary carrier in accordance with aspects of the present disclosure.

FIG. 6 illustrates an example of a process 600 that supports transmit delay sensitive uplink control on secondary carrier in accordance with aspects of the present disclosure. In some examples, process 600 may be implemented by or may implement aspects of wireless communications systems 100 and/or 200 and/or carrier configurations 300, 400, and/or 500. Aspects of process 600 may be implemented by base station 605 and/or UE 610, which may be examples of the corresponding devices described herein. In some aspects, base station 605 may be part of a PUCCH group configured for UE 610 supporting multi-carrier communications using at least a primary carrier and a secondary carrier. In one non-limiting example, base station 605 may be a PCell in the PUCCH group of UE 610.

At 615, base station 605 may transmit (and UE 610 may receive) a downlink transmission on a primary carrier and/or or secondary carrier associated with the PUCCH group. In some aspects, UE 610 may determine that a grant scheduling the downlink transmission is received a first threshold duration before transmitting the feedback message. In some aspects, UE 610 may determine that the downlink transmission is received a second threshold duration before transmitting the feedback message. In some aspects, this may include UE 610 transmitting (and base station 605 receiving) a message indicating a UE capability for transmitting the feedback message using the primary carrier and/or the secondary carrier.

At 620, UE 610 may determine acknowledgment information associated with the UE decoding the downlink transmission. In some aspects, this may include UE 610 determining whether it was able to successfully receive and decode PDCCH and/or PDSCH of the downlink transmission. For example, the acknowledgement information may be positive acknowledgement information (e.g., ACK) or negative acknowledgement information (e.g., NACK).

At 625, UE 610 may select, based on the acknowledgment information, the primary carrier and/or the secondary carrier for transmitting feedback to base station 605. In some aspects, this may include base station 605 transmitting (and UE 610 receiving) a signal configuring a first slot format pattern for the primary carrier and a second slot format pattern for the secondary carrier. In some aspects, UE 610 may select the primary carrier and/or secondary carrier for transmitting the feedback message based on the first slot format pattern and/or the second slot format pattern. In some aspects, the first slot format pattern and second slot format pattern may define staggered instances of uplink slots available for transmitting the feedback message in the time domain.

In some aspects, this may be based on base station 605 transmitting (and UE 610 receiving) a signal configuring a first set of resources for transmitting the feedback message on the primary carrier and a second set of resources for transmitting the feedback message on the secondary carrier. For example, UE 610 may determine that a resource usage for transmitting the feedback message and available resources in the first set of resources and/or second set of resources. UE 610 may select the primary carrier and/or secondary carrier based on the available resources satisfying the resource usage for transmitting the feedback message.

In some aspects, this may be based on the priority rule. For example, UE 610 may determine a priority rule associated with transmitting the feedback message on the primary carrier and/or secondary carrier. UE 610 may select the primary carrier and/or secondary carrier based on the priority rule and available resources configured for transmitting the feedback message satisfying the resource usage for transmitting the feedback message. The priority rule may include a first priority associated with the primary carrier and a second priority associate with secondary carrier, with the first priority being a higher priority than the second priority. Similarly, the priority rule may include the second priority associated with the secondary carrier (e.g., SCC1) and a third priority associated with an additional secondary carrier (e.g., SCC2), with the second priority being a higher priority than the third priority.

In some aspects, the priority rule may be overridden by various signaling. For example, base station 605 may transmit (and UE 610 may receive) a grant scheduling the downlink transmission and indicating the primary carrier and/or secondary carrier for transmitting the feedback message. UE 610 may select the primary carrier and/or secondary carrier to transmit the feedback message as indicated in the grant scheduling the downlink transmission, which overrides the priority rule. In another example, base station 605 may transmit (and UE 610 may receive) a grant activating semi-persistent resources for the downlink transmission and indicating the primary carrier and/or secondary carrier for transmitting the feedback message. UE 610 may select the primary carrier and/or secondary carrier as indicated in the grant for transmission of the feedback message, which may override the priority rule. In another example, base station 605 may transmit (and UE 610 may receive) a configuration signal indicating semi-persistent resources for the downlink transmission and indicating the primary carrier and/or secondary carrier for transmitting the feedback message. UE 610 may select the primary carrier and/or secondary carrier as indicated in the configuration signal for transmitting the feedback message, which may override the priority rule.

At 630, UE 610 may transmit (and base station 605 may receive) a feedback message indicating the acknowledgment information using the primary carrier and/or the secondary carrier. In some aspects, transmitting the feedback message may be based at least in part on the first threshold duration and/or the second threshold duration.

In some aspects, this may include UE 610 selecting both the primary carrier and the secondary carrier for transmitting the feedback message. For example, UE 610 may transmit a first feedback message on the primary carrier using a first codebook generated based on downlink transmissions received on the primary carrier. UE 610 may transmit a second feedback message on the secondary carrier using a second codebook generated based on downlink transmissions received on the secondary carrier. In another example, UE 610 may transmit, on both the primary carrier and secondary carrier, the feedback message using a combined codebook generated based on downlink transmissions received on the primary carrier and secondary carrier.

In some aspects, this may include UE 610 determining that an uplink transmission is scheduled to be transmitted to base station 605. UE 610 may determine that a traffic type associated with the uplink transmission is a traffic type supported by the UE for transmission on the secondary carrier (e.g., an URLLC traffic type), and therefore select the secondary carrier for transmission of the uplink transmission. UE 610 may determine that a second uplink transmission is scheduled to be transmitted to base station 605. UE 610 may determine that a second traffic type associated with the second uplink transmission is a second traffic type supported by the UE for transmission on the primary carrier (e.g., a eMBB traffic type). UE 610 may select the primary carrier for transmission of the second uplink transmission based on the second traffic type.

Figure 7:
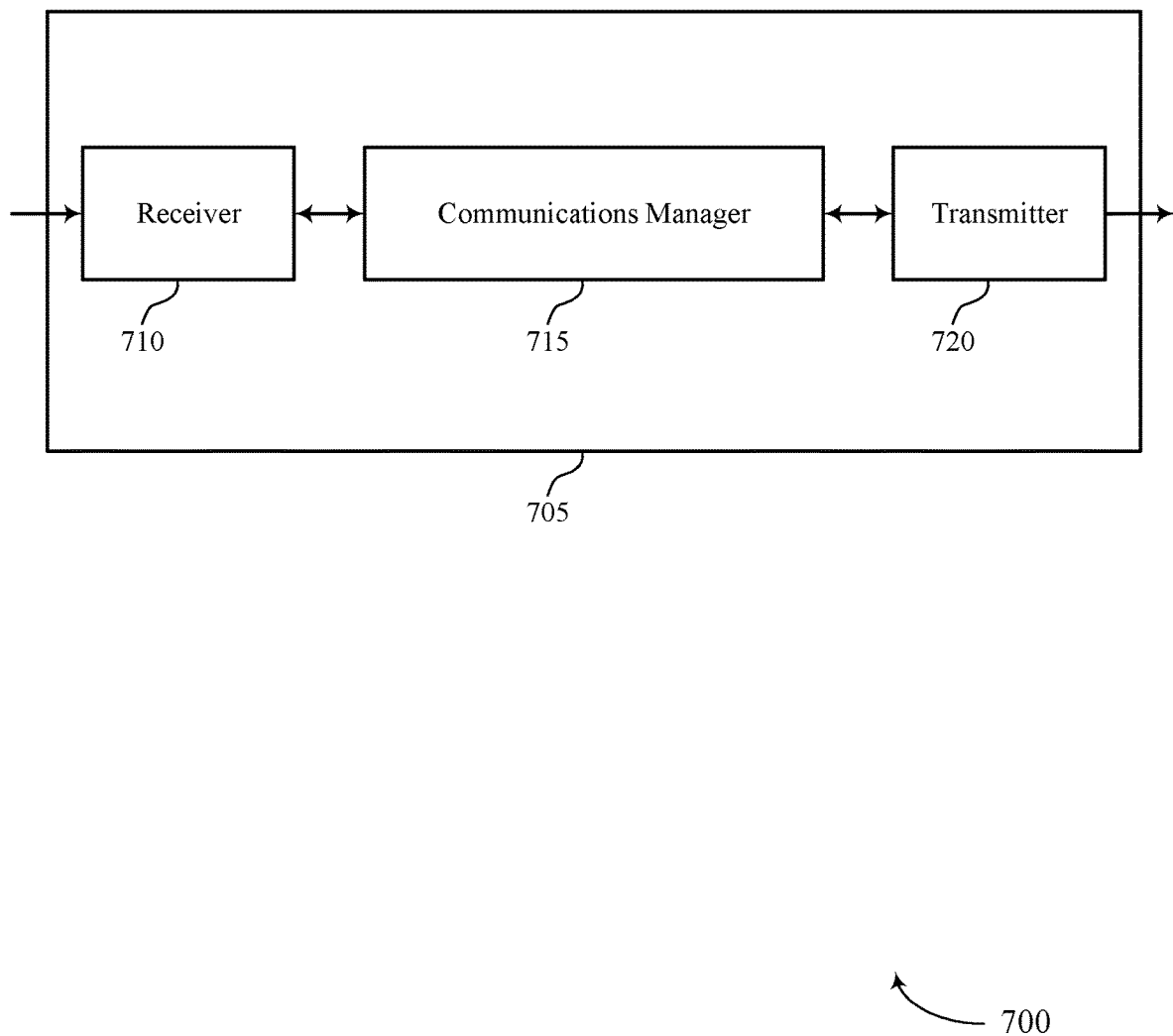
FIGS. 7 and 8 show block diagrams of devices that support transmit delay sensitive uplink control on secondary carrier in accordance with aspects of the present disclosure.

FIG. 7 shows a block diagram 700 of a device 705 that supports transmit delay sensitive uplink control on secondary carrier in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmit delay sensitive uplink control on secondary carrier, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a downlink transmission on at least one of a primary carrier associated with a PUCCH group or a secondary carrier associated with the PUCCH group. The communications manager 715 may determine acknowledgement information associated with the UE decoding the downlink transmission. The communications manager 715 may select, based on determining the acknowledgement information, at least one of the primary carrier or the secondary carrier for transmitting feedback to the base station. The communications manager 715 may transmit, based on selecting at least one of the primary carrier or the secondary carrier, a feedback message indicating the acknowledgement information using at least one of the primary carrier or the secondary carrier. The communications manager 715 may be an example of aspects of the communications manager 1010 described herein.

The communications manager 715 may select at least one of a primary carrier associated with a PUCCH group or a secondary carrier associated with the PUCCH group for transmitting a PUCCH message to a base station. The communications manager 715 may transmit, based at least in part on selecting at least one of the primary carrier or the secondary carrier, the PUCCH message to the base station using at least one of the primary carrier or the secondary carrier The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
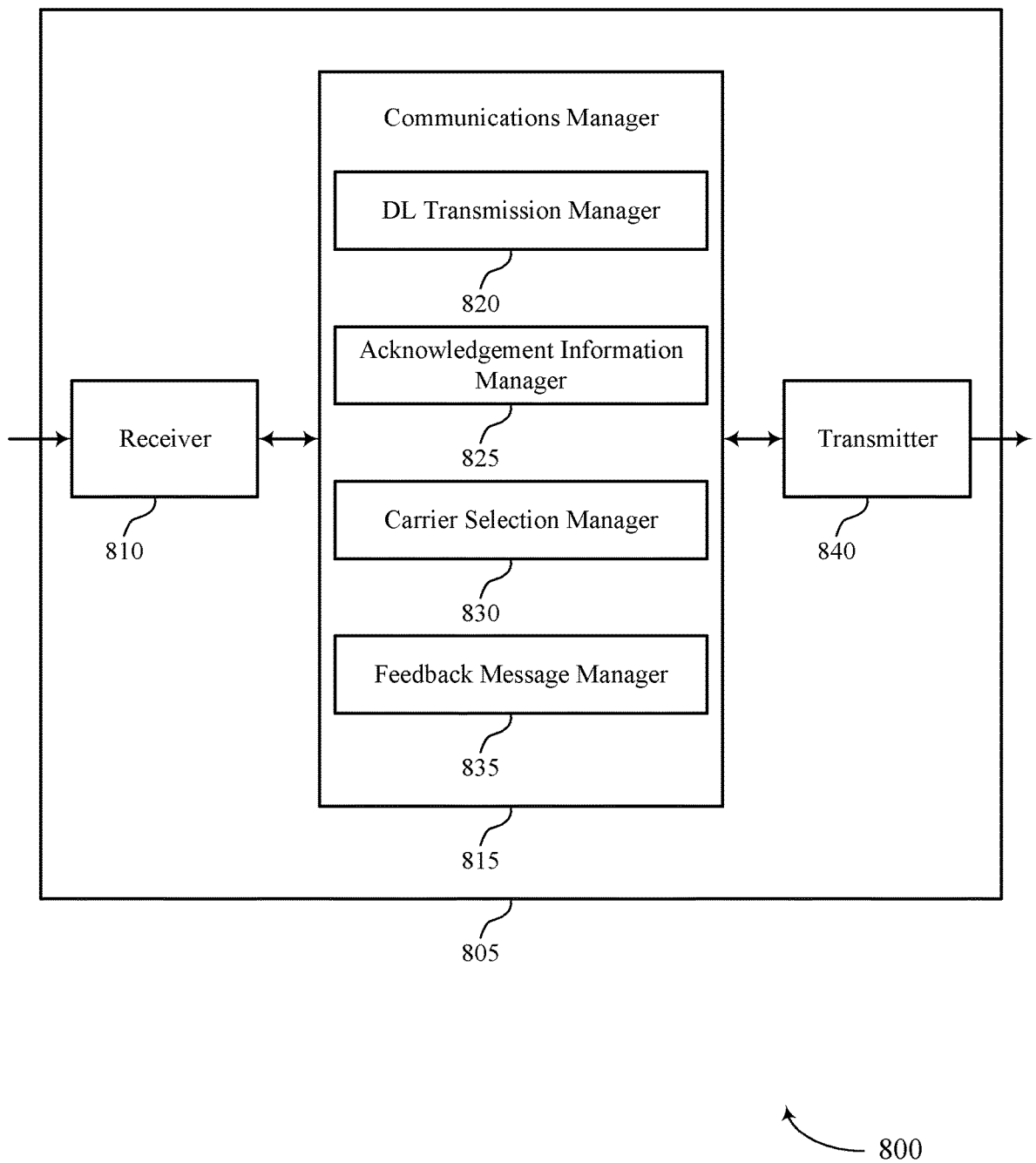

FIG. 8 shows a block diagram 800 of a device 805 that supports transmit delay sensitive uplink control on secondary carrier in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to transmit delay sensitive uplink control on secondary carrier, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a DL transmission manager 820, an acknowledgement information manager 825, a carrier selection manager 830, and a feedback message manager 835. The communications manager 815 may be an example of aspects of the communications manager 1010 described herein.

The DL transmission manager 820 may receive, from a base station, a downlink transmission on at least one of a primary carrier associated with a PUCCH group or a secondary carrier associated with the PUCCH group.

The acknowledgement information manager 825 may determine acknowledgement information associated with the UE decoding the downlink transmission.

The carrier selection manager 830 may select, based on determining the acknowledgement information, at least one of the primary carrier or the secondary carrier for transmitting feedback to the base station. The carrier selection manager 830 may select at least one of a primary carrier associated with a PUCCH group or a secondary carrier associated with the PUCCH group for transmitting a PUCCH message to a base station.

The feedback message manager 835 may transmit, based on selecting at least one of the primary carrier or the secondary carrier, a feedback message indicating the acknowledgement information using at least one of the primary carrier or the secondary carrier. The feedback message manager 835 may transmit, based at least in part on selecting at least one of the primary carrier or the secondary carrier, the PUCCH message to the base station using at least one of the primary carrier or the secondary carrier.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
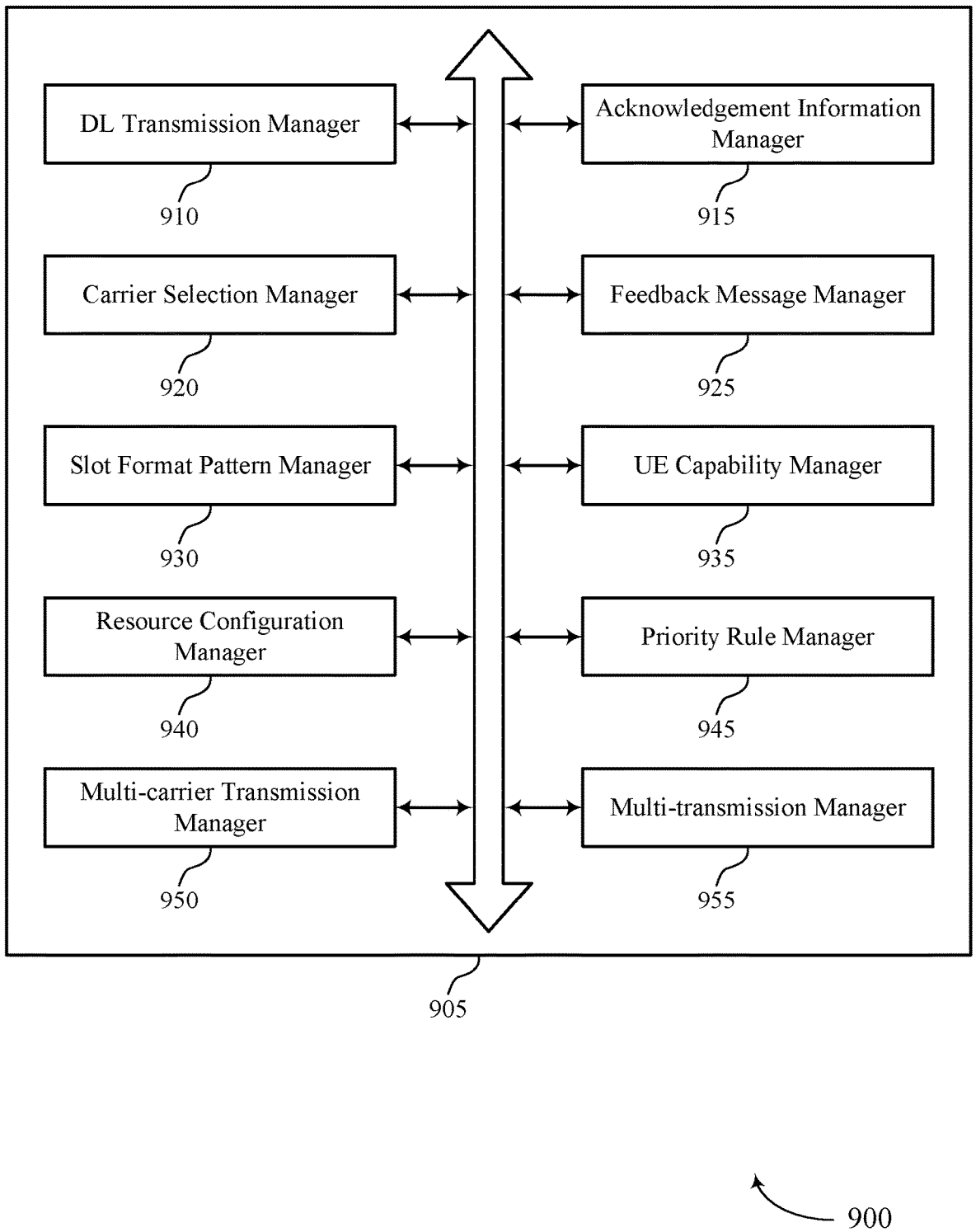
FIG. 9 shows a block diagram of a communications manager that supports transmit delay sensitive uplink control on secondary carrier in accordance with aspects of the present disclosure.

FIG. 9 shows a block diagram 900 of a communications manager 905 that supports transmit delay sensitive uplink control on secondary carrier in accordance with aspects of the present disclosure. The communications manager 905 may be an example of aspects of a communications manager 715, a communications manager 815, or a communications manager 1010 described herein. The communications manager 905 may include a DL transmission manager 910, an acknowledgement information manager 915, a carrier selection manager 920, a feedback message manager 925, a slot format pattern manager 930, an UE capability manager 935, a resource configuration manager 940, a priority rule manager 945, a multi-carrier transmission manager 950, and a multi-transmission manager 955. Each of these modules may communicate, directly or indirectly, with one another (e.g., via one or more buses).

The DL transmission manager 910 may receive, from a base station, a downlink transmission on at least one of a primary carrier associated with a PUCCH group or a secondary carrier associated with the PUCCH group.

The acknowledgement information manager 915 may determine acknowledgement information associated with the UE decoding the downlink transmission. In some cases, the acknowledgement information includes at least one of an acknowledgement or a negative acknowledgement.

The carrier selection manager 920 may select, based on determining the acknowledgement information, at least one of the primary carrier or the secondary carrier for transmitting feedback to the base station. In some cases, the primary carrier, the secondary carrier, or a combination thereof, each include a TDD carrier, a FDD carrier, or both. The carrier selection manager 920 may select at least one of a primary carrier associated with a PUCCH group or a secondary carrier associated with the PUCCH group for transmitting a PUCCH message to a base station.

The feedback message manager 925 may transmit, based on selecting at least one of the primary carrier or the secondary carrier, a feedback message indicating the acknowledgement information using at least one of the primary carrier or the secondary carrier. In some cases, the feedback message includes a HARQ-ACK message, a reference signal measurement report transmission (e.g., CSI-RS measurement report), a SR, or a combination thereof. The feedback message manager 925 may transmit, based at least in part on selecting at least one of the primary carrier or the secondary carrier, the PUCCH message to the base station using at least one of the primary carrier or the secondary carrier.

The slot format pattern manager 930 may receive a signal configuring a first slot format pattern for the primary carrier and a second slot format pattern for the secondary carrier, where the selecting is based on the first slot format pattern, the second slot format pattern, or a combination thereof. In some examples, the slot format pattern manager 930 may determine that a grant scheduling the downlink transmission is received a first threshold duration before transmitting the feedback message. In some examples, the slot format pattern manager 930 may determine that the downlink transmission is received a second threshold duration before transmitting the feedback message, where transmitting the feedback message is based on the first threshold duration and the second threshold duration.

In some cases, the first slot format pattern and the second slot format pattern together include staggered instances of uplink slots available for transmitting the feedback message in the time domain. In some cases, the staggered instances includes an uplink slot available on the primary carrier, the secondary carrier, or both, during each slot.

The UE capability manager 935 may transmit a message indicating a UE capability for transmitting the feedback message using at least one of the primary carrier or the secondary carrier, where receiving the downlink transmission on at least one of the primary carrier or the secondary carrier is based on the UE capability. The UE capability manager 935 may transmit a message indicating a UE capability for transmitting the PUCCH message using at least one of the primary carrier or the secondary carrier, wherein the selecting the at least one of the primary carrier or the secondary carrier is based at least in part on the UE capability.

The resource configuration manager 940 may receive a signal configuring a first set of resources for transmitting the feedback message on the primary carrier and a second set of resources for transmitting the feedback message on the secondary carrier, where the selecting is based on the first set of resources and the second set of resources. In some examples, the resource configuration manager 940 may receive a signal configuring a first set of resources for transmitting the PUCCH message on the primary carrier and a second set of resources for transmitting the PUCCH message on the secondary carrier, where the selecting is based on the first set of resources and the second set of resources. In some examples, the resource configuration manager 940 may determine a resource usage for transmitting the feedback message. In some examples, the resource configuration manager 940 may determine available resources in the first set of resources and available resources in the second set of resources, where the selecting is based on the available resources satisfying the resource usage for transmitting the feedback message. In some examples, the resource configuration manager 940 may determine a resource usage for transmitting the PUCCH message. In some examples, the resource configuration manager 940 may determine available resources in the first set of resources and available resources in the second set of resources, where the selecting is based on the available resources satisfying the resource usage for transmitting the PUCCH message.

The priority rule manager 945 may determine a priority rule associated with transmitting the feedback message on the primary carrier and the secondary carrier, where the selecting is based on the priority rule and available resources configured for transmitting the feedback message satisfying a resource usage for transmitting the feedback message. The priority rule manager 945 may determine a priority rule associated with transmitting the PUCCH message on the primary carrier and the secondary carrier, where the selecting is based on the priority rule and available resources configured for transmitting the feedback message satisfying a resource usage for transmitting the PUCCH message. In some examples, the priority rule manager 945 may receive a grant scheduling the downlink transmission and indicating the primary carrier or the secondary carrier for transmitting the feedback message. In some examples, the priority rule manager 945 may receive a grant activating semi-persistent resources for the downlink transmission and indicating the primary carrier or the secondary carrier for transmitting the feedback message.

In some examples, the priority rule manager 945 may receive a configuration signal indicating semi-persistent resources for the downlink transmission and indicating the primary carrier or the secondary carrier for transmitting the feedback message. In some examples, the priority rule manager 945 may receive a configuration signal indicating semi-persistent resources for a downlink transmission and indicating the primary carrier or the secondary carrier for transmitting the PUCCH message. In some cases, the priority rule includes a first priority associated with the primary carrier and a second priority associated with the secondary carrier, the first priority being a higher priority than the second priority. In some cases, the priority rule includes a second priority associated with the secondary carrier and a third priority associated with an additional secondary carrier, the second priority being a higher priority than the third priority. In some cases, the selecting the at least one of the primary carrier or the secondary carrier to transmit the feedback message based on the grant overrides the priority rule. In some cases, the selecting the at least one of the primary carrier or the secondary carrier to transmit the feedback message based on the configuration signal overrides the priority rule.

The multi-carrier transmission manager 950 may select the primary carrier and the secondary carrier for transmitting the feedback message. In some examples, the multi-carrier transmission manager 950 may transmit, on the primary carrier, a first feedback message using a first codebook generated based on one or more downlink transmissions received on the primary carrier. In some examples, the multi-carrier transmission manager 950 may transmit, on the secondary carrier, a second feedback message using a second codebook generated based on one or more downlink transmissions received on the secondary carrier. In some examples, the multi-carrier transmission manager 950 may transmit, on the primary carrier and the secondary carrier, the feedback message using a combined codebook generated based on one or more downlink transmissions received on the primary carrier and the secondary carrier.

The multi-carrier transmission manager 950 may select the primary carrier and the secondary carrier for transmitting the PUCCH message. In some examples, the multi-carrier transmission manager 950 may transmit, on the primary carrier, a first PUCCH message using a first codebook generated based on one or more downlink transmissions received on the primary carrier. In some examples, the multi-carrier transmission manager 950 may transmit, on the secondary carrier, a second PUCCH message using a second codebook generated based on one or more downlink transmissions received on the secondary carrier. In some examples, the multi-carrier transmission manager 950 may transmit, on the primary carrier and the secondary carrier, the PUCCH message using a combined codebook generated based on one or more downlink transmissions received on the primary carrier and the secondary carrier.

The multi-transmission manager 955 may determine that an uplink transmission is scheduled to be transmitted to the base station. In some examples, the multi-transmission manager 955 may determine that a traffic type associated with the uplink transmission is a traffic type supported by the UE for transmission on the secondary carrier. In some examples, the multi-transmission manager 955 may select the secondary carrier for transmission of the uplink transmission based on the traffic type. In some examples, the multi-transmission manager 955 may determine that a second uplink transmission is scheduled to be transmitted to the base station. In some examples, the multi-transmission manager 955 may determine that a second traffic type associated with the second uplink transmission is a second traffic type supported by the UE for transmission on the primary carrier. In some examples, the multi-transmission manager 955 may select the primary carrier for transmission of the second uplink transmission based on the second traffic type. In some cases, the traffic type associated with the uplink transmission includes an URLLC traffic type, and where the second traffic type associated with the second uplink transmission includes an eMBB traffic type. In some cases, the PUCCH message comprises a first HARQ message associated with a dynamically scheduled downlink transmission, a second HARQ message associated with a semi-persistent activated downlink transmission, a first reference signal measurement report transmission associated with a periodic CSI-RS, a second reference signal measurement report associated with an aperiodic CSI-RS, a third reference signal measurement report associated with a semi-persistent CSI-RS, a SR, or a combination thereof.

Figure 10:
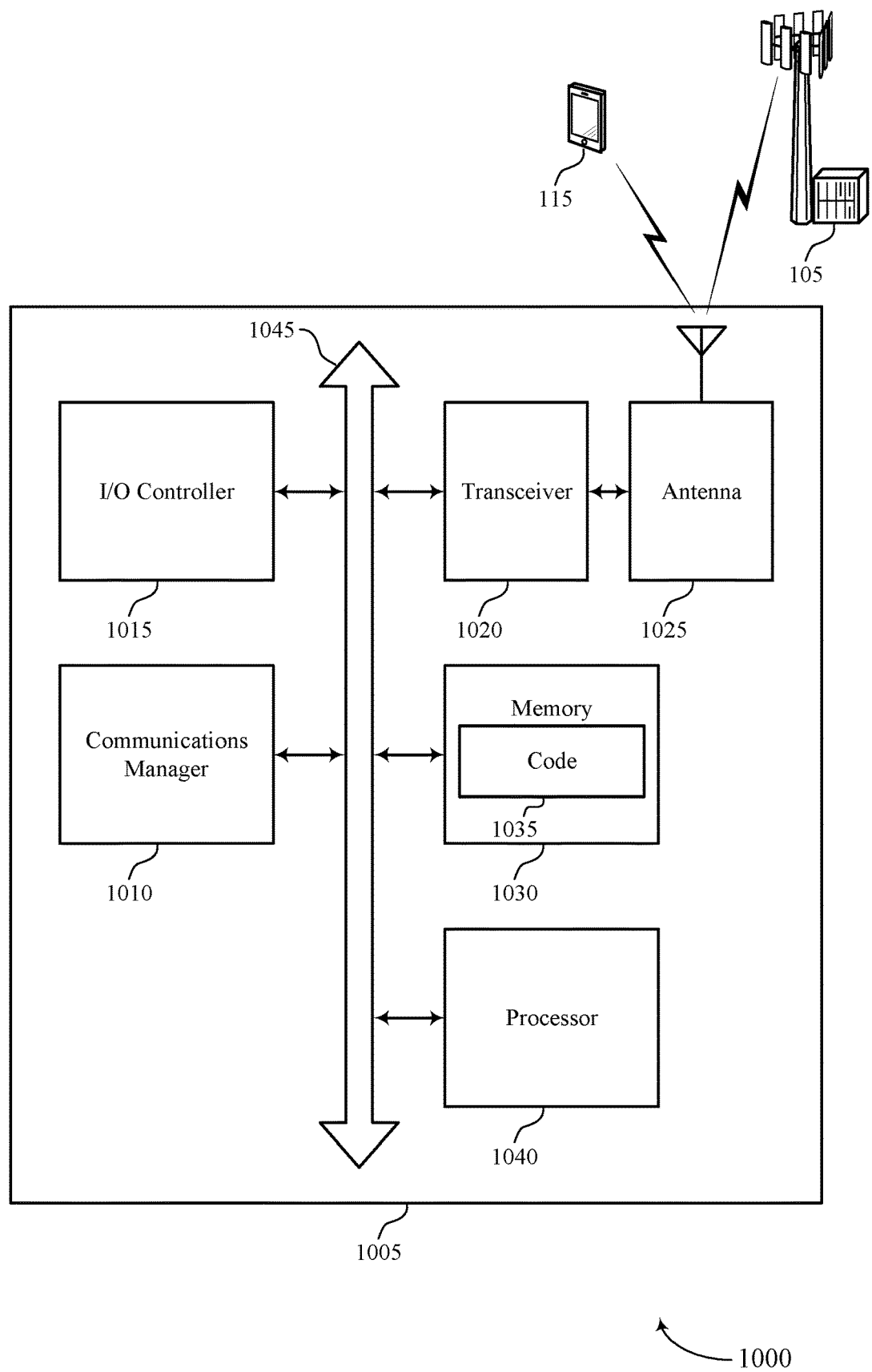
FIG. 10 shows a diagram of a system including a device that supports transmit delay sensitive uplink control on secondary carrier in accordance with aspects of the present disclosure.

FIG. 10 shows a diagram of a system 1000 including a device 1005 that supports transmit delay sensitive uplink control on secondary carrier in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a downlink transmission on at least one of a primary carrier associated with a PUCCH group or a secondary carrier associated with the PUCCH group. The communications manager 1010 may determine acknowledgement information associated with the UE decoding the downlink transmission The communications manager 1010 may select, based on determining the acknowledgement information, at least one of the primary carrier or the secondary carrier for transmitting feedback to the base station. The communications manager 1010 may transmit, based on selecting at least one of the primary carrier or the secondary carrier, a feedback message indicating the acknowledgement information using at least one of the primary carrier or the secondary carrier. The communications manager 1010 may select at least one of a primary carrier associated with a PUCCH group or a secondary carrier associated with the PUCCH group for transmitting a PUCCH message to a base station. The communications manager 1010 may transmit, based at least in part on selecting at least one of the primary carrier or the secondary carrier, the PUCCH message to the base station using at least one of the primary carrier or the secondary carrier. The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmit delay sensitive uplink control on secondary carrier).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
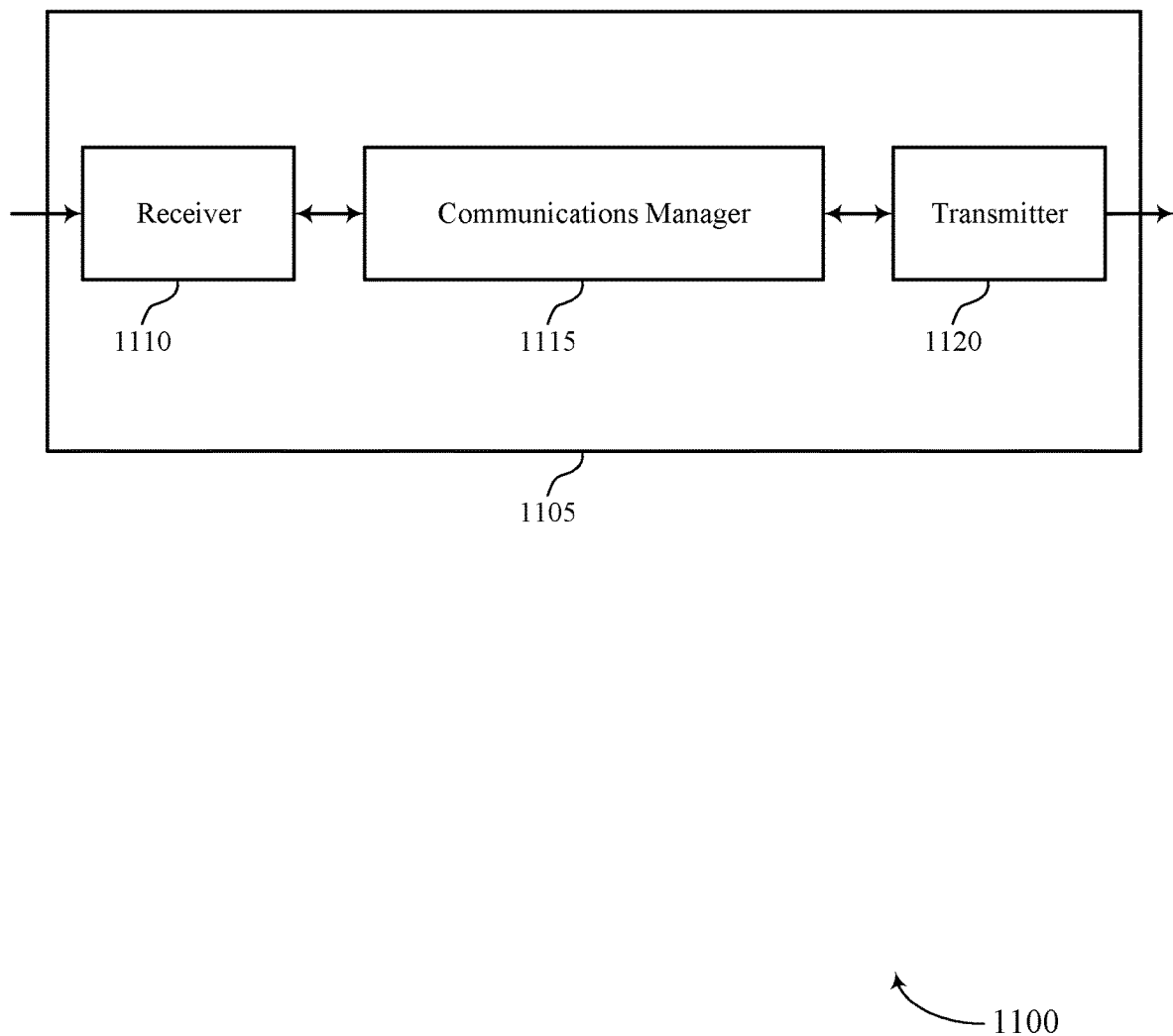
FIGS. 11 and 12 show block diagrams of devices that support transmit delay sensitive uplink control on secondary carrier in accordance with aspects of the present disclosure.

FIG. 11 shows a block diagram 1100 of a device 1105 that supports transmit delay sensitive uplink control on secondary carrier in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmit delay sensitive uplink control on secondary carrier, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a downlink transmission on at least one of a primary carrier associated with a PUCCH group or a secondary carrier associated with the PUCCH group. The communications manager 1115 may receive, based on a selection of at least one of the primary carrier or the secondary carrier, a feedback message indicating acknowledgement information using at least one of the primary carrier or the secondary carrier. The communications manager 1115 may receive, from a UE and based at least in part on a selection of at least one of a primary carrier associated with a PUCCH group or a secondary carrier associated with the PUCCH group, a PUCCH message using at least one of the primary carrier or the secondary carrier. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
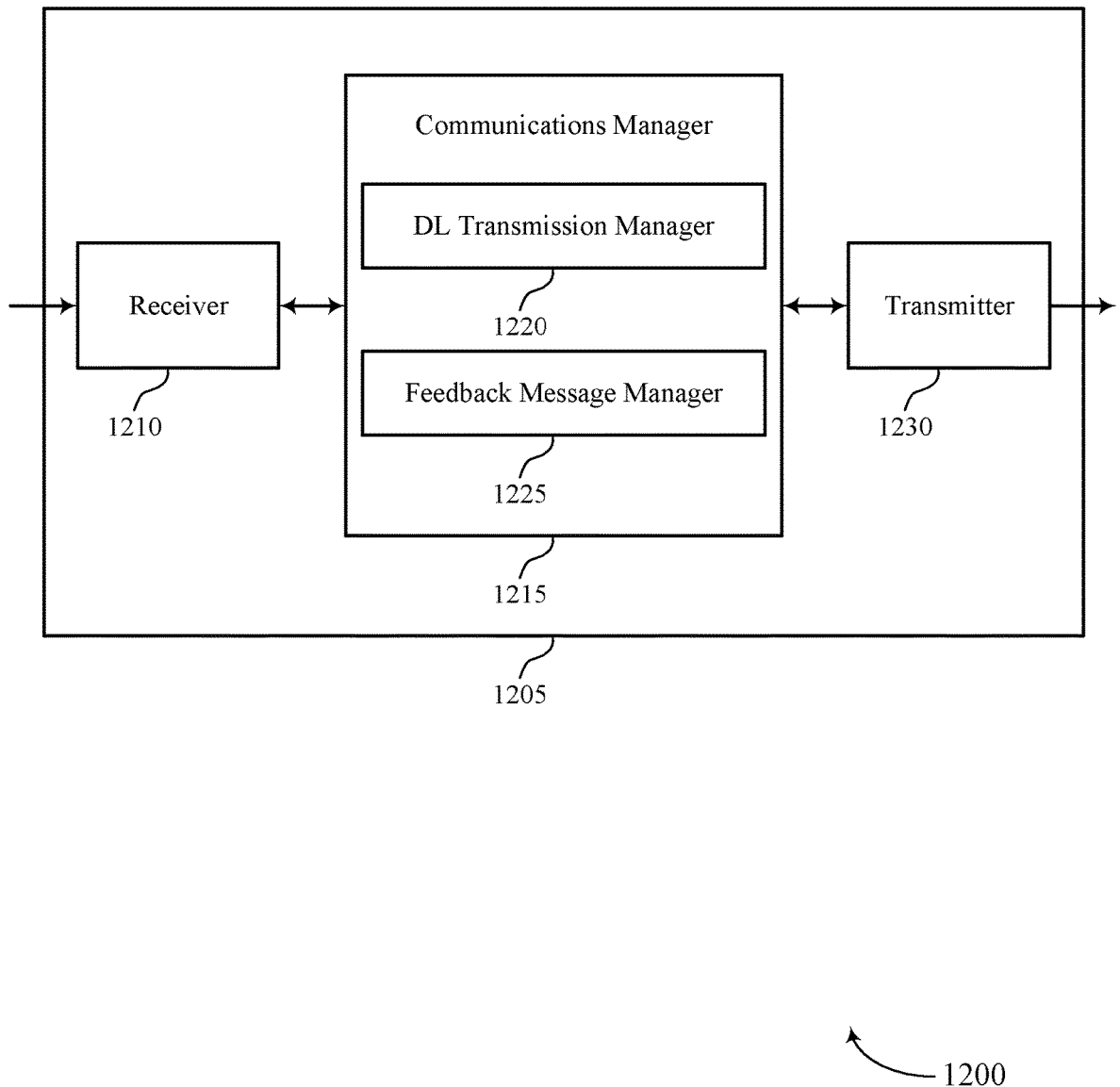

FIG. 12 shows a block diagram 1200 of a device 1205 that supports transmit delay sensitive uplink control on secondary carrier in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to transmit delay sensitive uplink control on secondary carrier, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a DL transmission manager 1220 and a feedback message manager 1225. The communications manager 1215 may be an example of aspects of the communications manager 1410 described herein.

The DL transmission manager 1220 may transmit, to a UE, a downlink transmission on at least one of a primary carrier associated with a PUCCH group or a secondary carrier associated with the PUCCH group.

The feedback message manager 1225 may receive, based on a selection of at least one of the primary carrier or the secondary carrier, a feedback message indicating acknowledgement information using at least one of the primary carrier or the secondary carrier. The feedback message manager 1225 may receive, from a UE and based at least in part on a selection of at least one of a primary carrier associated with a PUCCH group or a secondary carrier associated with the PUCCH group, a PUCCH message using at least one of the primary carrier or the secondary carrier.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
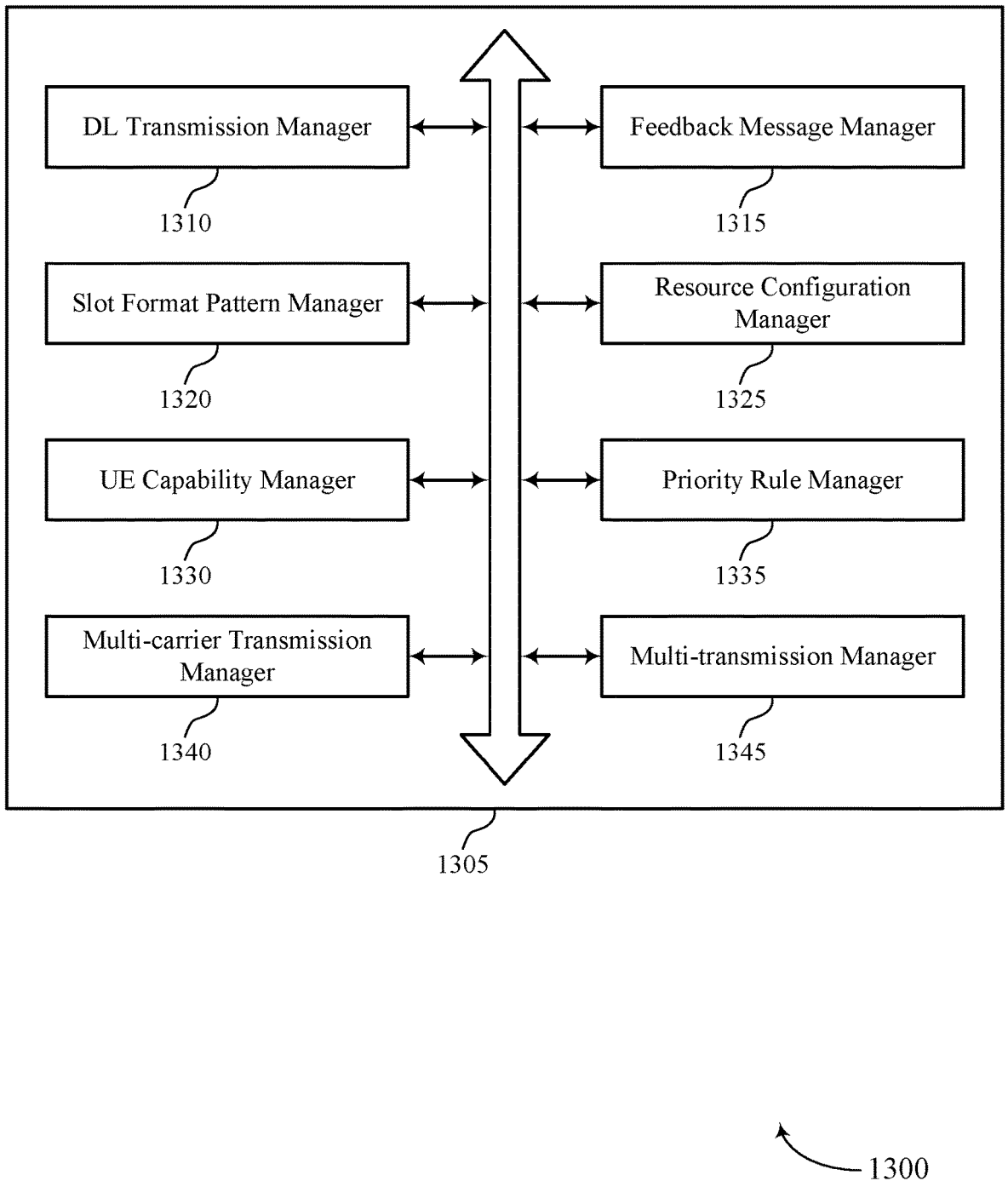
FIG. 13 shows a block diagram of a communications manager that supports transmit delay sensitive uplink control on secondary carrier in accordance with aspects of the present disclosure.

FIG. 13 shows a block diagram 1300 of a communications manager 1305 that supports transmit delay sensitive uplink control on secondary carrier in accordance with aspects of the present disclosure. The communications manager 1305 may be an example of aspects of a communications manager 1115, a communications manager 1215, or a communications manager 1410 described herein. The communications manager 1305 may include a DL transmission manager 1310, a feedback message manager 1315, a slot format pattern manager 1320, a resource configuration manager 1325, an UE capability manager 1330, a priority rule manager 1335, a multi-carrier transmission manager 1340, and a multi-transmission manager 1345. Each of these modules may communicate, directly or indirectly, with one another (e.g., via one or more buses).

The DL transmission manager 1310 may transmit, to a UE, a downlink transmission on at least one of a primary carrier associated with a PUCCH group or a secondary carrier associated with the PUCCH group. In some cases, the primary carrier, the secondary carrier, or a combination thereof, each include a time-division duplexing carrier, a frequency-division duplexing carrier, or both.

The feedback message manager 1315 may receive, based on a selection of at least one of the primary carrier or the secondary carrier, a feedback message indicating acknowledgement information using at least one of the primary carrier or the secondary carrier. In some cases, the acknowledgement information includes at least one of an acknowledgement or a negative acknowledgement. The feedback message manager 1315 may receive, from a UE and based at least in part on a selection of at least one of a primary carrier associated with a PUCCH group or a secondary carrier associated with the PUCCH group, a PUCCH message using at least one of the primary carrier or the secondary carrier. In some cases, the feedback message includes a HARQ acknowledgement message, a reference signal measurement report transmission, a SR, or a combination thereof.

The slot format pattern manager 1320 may transmit a signal configuring a first slot format pattern for the primary carrier and a second slot format pattern for the secondary carrier, where receiving the feedback message from the UE is based on the first slot format pattern, the second slot format pattern, or a combination thereof. In some examples, the slot format pattern manager 1320 may transmit a grant scheduling the downlink transmission a first threshold duration before the UE transmits the feedback message. In some examples, the slot format pattern manager 1320 may transmit the downlink transmission a second threshold duration before the UE transmits the feedback message, where receiving the feedback message is based on the first threshold duration and the second threshold duration. In some cases, the first slot format pattern and the second slot format pattern together include staggered instances of uplink slots available for transmitting the feedback message in the time domain.

The slot format pattern manager 1320 may transmit a signal configuring a first slot format pattern for the primary carrier and a second slot format pattern for the secondary carrier, wherein receiving the PUCCH message from the UE is based at least in part on the first format pattern, the second slot format pattern, or a combination thereof. In some cases, the first slot format pattern and the second slot format pattern together comprise staggered instances of uplink slots available for transmitting the feedback message in the time domain. In some cases, the staggered instances comprises an uplink slot available on the primary carrier, the secondary carrier, or both, during each slot.

The resource configuration manager 1325 may transmit a signal configuring a first set of resources for transmitting the feedback message on the primary carrier and a second set of resources for transmitting the feedback message on the secondary carrier, where the UE selecting the primary carrier or the secondary carrier is based on the first set of resources and the second set of resources.

The UE capability manager 1330 may receive a message indicating a UE capability for transmitting the feedback message using at least one of the primary carrier or the secondary carrier, where transmitting the downlink transmission on at least one of the primary carrier or the secondary carrier is based on the UE capability.

The priority rule manager 1335 may determine a priority rule associated with receiving the feedback message on the primary carrier and the secondary carrier, where the UE selecting the primary carrier or the secondary carrier is based on the priority rule and available resources configured for transmitting the feedback message satisfying a resource usage for transmitting the feedback message. In some examples, the priority rule manager 1335 may transmit a grant scheduling the downlink transmission and indicating the primary carrier or the secondary carrier for transmitting the feedback message, where the grant indicating the primary carrier or the secondary carrier overrides the priority rule for selecting the primary carrier or secondary carrier to transmit the feedback message.

In some examples, the priority rule manager 1335 may transmit a grant activating semi-persistent resources for the downlink transmission and indicating the primary carrier or the secondary carrier for transmitting the feedback message, where the grant indicating the primary carrier or the secondary carrier overrides the priority rule for selecting the primary carrier or secondary carrier to transmit the feedback message. In some examples, the priority rule manager 1335 may transmit a configuration signal indicating semi-persistent resources for the downlink transmission and indicating the primary carrier or the secondary carrier for transmitting the feedback message, where the configuration signal indicating the primary carrier or the secondary carrier overrides the priority rule for selecting the primary carrier or secondary carrier to transmit the feedback message. In some cases, the priority rule includes a first priority associated with the primary carrier and a second priority associated with the secondary carrier, the first priority being a higher priority than the second priority. In some cases, the priority rule includes a second priority associated with the secondary carrier and a third priority associated with an additional secondary carrier, the second priority being a higher priority than the third priority.

The multi-carrier transmission manager 1340 may receive the feedback message on the primary carrier and the secondary carrier. In some examples, the multi-carrier transmission manager 1340 may receive, on the primary carrier, a first feedback message using a first codebook generated based on one or more downlink transmissions transmitted on the primary carrier. In some examples, the multi-carrier transmission manager 1340 may receive, on the secondary carrier, a second feedback message using a second codebook generated based on one or more downlink transmissions transmitted on the secondary carrier. In some examples, the multi-carrier transmission manager 1340 may receive, on the primary carrier and the secondary carrier, the feedback message using a combined codebook generated based on one or more downlink transmissions transmitted on the primary carrier and the secondary carrier.

The multi-transmission manager 1345 may determine that an uplink transmission is scheduled to be transmitted from the UE. In some examples, the multi-transmission manager 1345 may determine that a traffic type associated with the uplink transmission is a traffic type supported by the UE for transmission on the secondary carrier. In some examples, the multi-transmission manager 1345 may receive the uplink transmission on the secondary carrier based on the traffic type. In some examples, the multi-transmission manager 1345 may determine that a second uplink transmission is scheduled to be transmitted to the base station. In some examples, the multi-transmission manager 1345 may determine that a second traffic type associated with the second uplink transmission is a second traffic type supported by the UE for transmission on the primary carrier. In some examples, the multi-transmission manager 1345 may receive the second uplink transmission on the primary carrier based on the second traffic type. In some cases, the traffic type associated with the uplink transmission includes an URLLC traffic type, and where the traffic type associated with the uplink transmission includes an eMBB traffic type.

Figure 14:
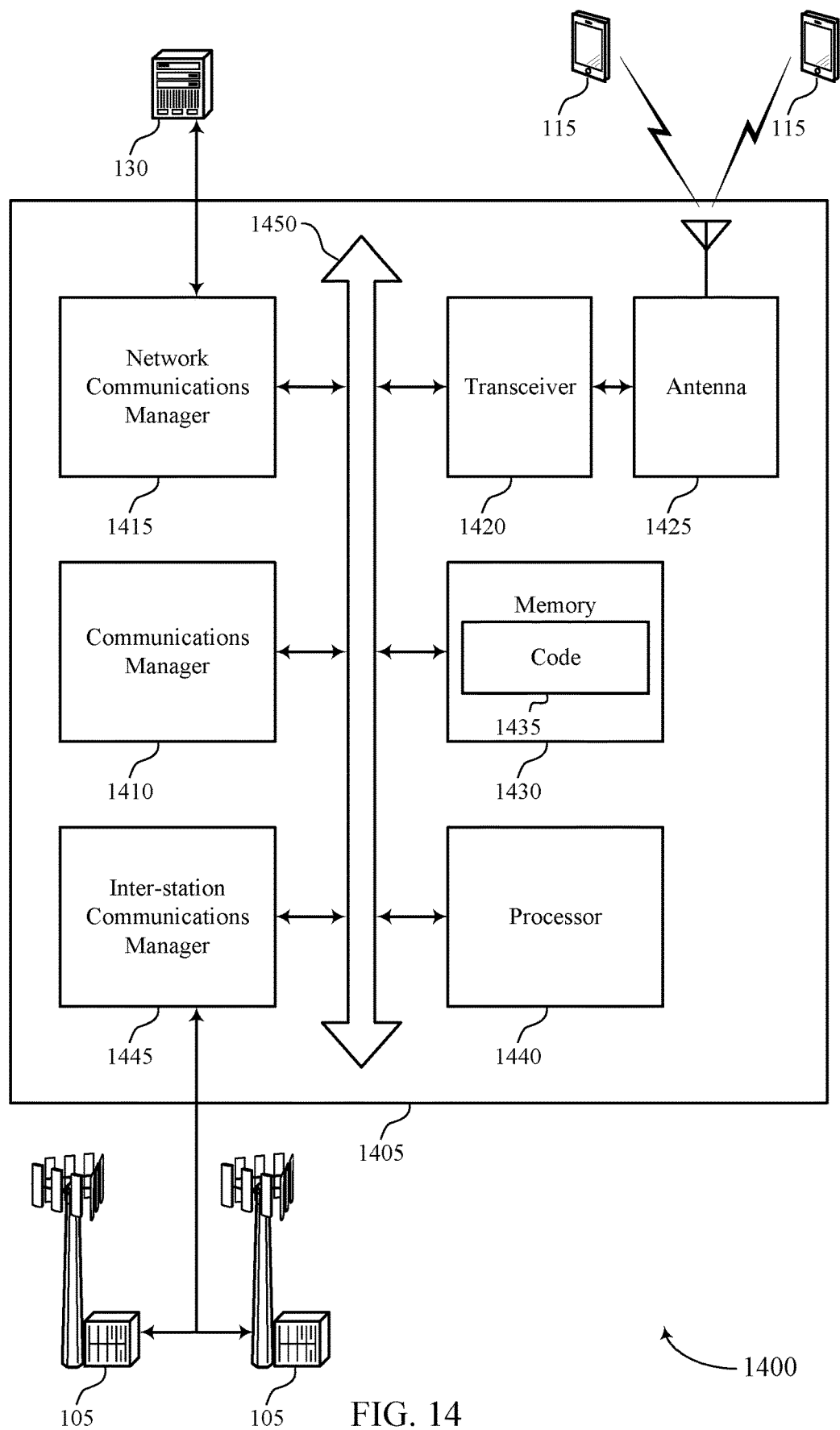
FIG. 14 shows a diagram of a system including a device that supports transmit delay sensitive uplink control on secondary carrier in accordance with aspects of the present disclosure.

FIG. 14 shows a diagram of a system 1400 including a device 1405 that supports transmit delay sensitive uplink control on secondary carrier in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a downlink transmission on at least one of a primary carrier associated with a PUCCH group or a secondary carrier associated with the PUCCH group. The communications manager 1410 may receive, based on a selection of at least one of the primary carrier or the secondary carrier, a feedback message indicating acknowledgement information using at least one of the primary carrier or the secondary carrier. The communications manager 1410 may receive, from a UE and based at least in part on a selection of at least one of a primary carrier associated with a PUCCH group or a secondary carrier associated with the PUCCH group, a PUCCH message using at least one of the primary carrier or the secondary carrier.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting transmit delay sensitive uplink control on secondary carrier).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
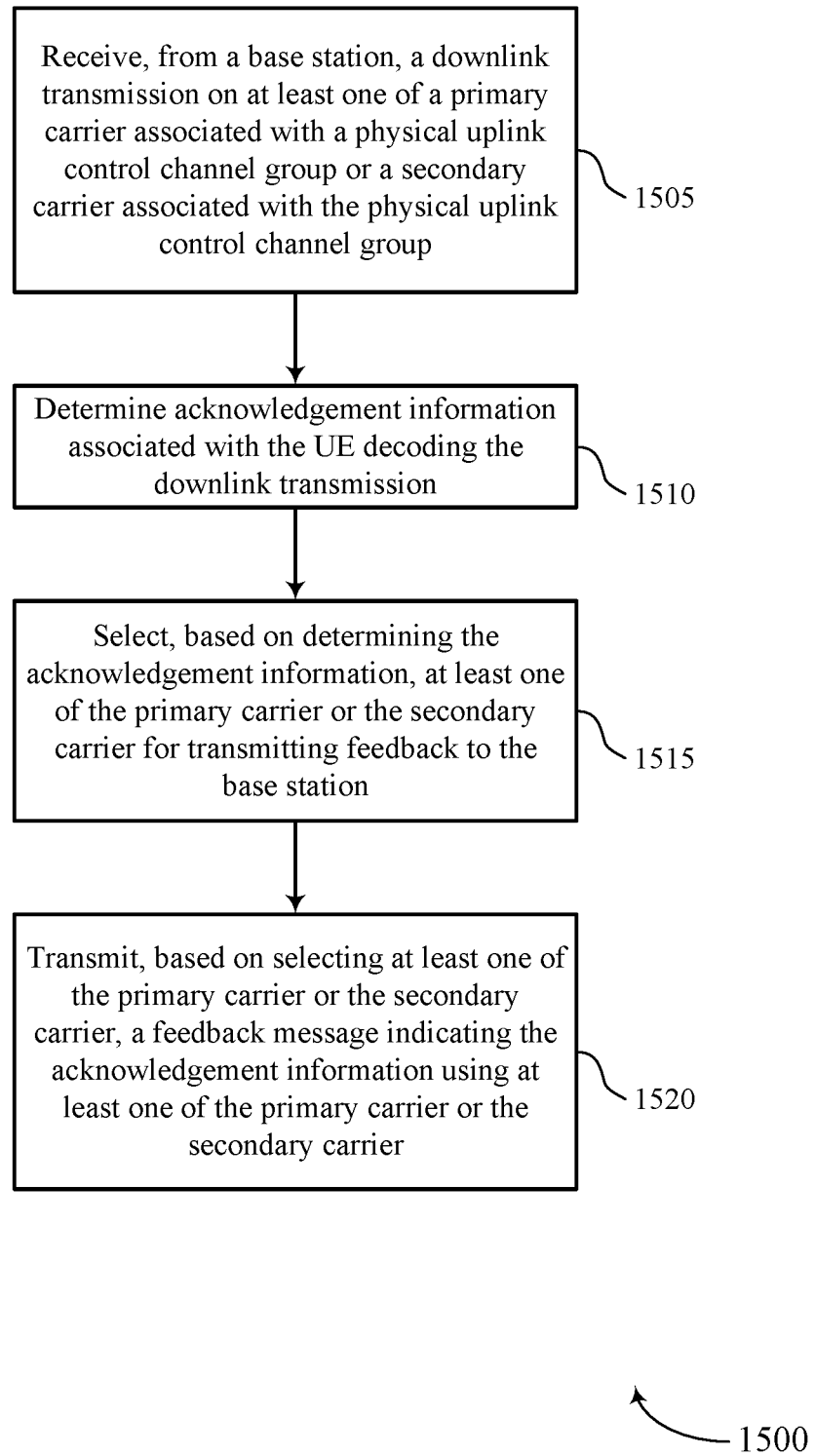
FIGS. 15 through 19 show flowcharts illustrating methods that support transmit delay sensitive uplink control on secondary carrier in accordance with aspects of the present disclosure.

FIG. 15 shows a flowchart illustrating a method 1500 that supports transmit delay sensitive uplink control on secondary carrier in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may optionally receive, from a base station, a downlink transmission on at least one of a primary carrier associated with a PUCCH group or a secondary carrier associated with the PUCCH group. The operations of 1505 may be performed according to the methods described herein. In some examples, aspects of the operations of 1505 may be performed by a DL transmission manager as described with reference to FIGS. 7 through 10.

At 1510, the UE may optionally determine acknowledgement information associated with the UE decoding the downlink transmission. The operations of 1510 may be performed according to the methods described herein. In some examples, aspects of the operations of 1510 may be performed by an acknowledgement information manager as described with reference to FIGS. 7 through 10.

At 1515, the UE may select, based on determining the acknowledgement information, at least one of the primary carrier or the secondary carrier for transmitting feedback to the base station. The operations of 1515 may be performed according to the methods described herein. In some examples, aspects of the operations of 1515 may be performed by a carrier selection manager as described with reference to FIGS. 7 through 10.

At 1520, the UE may transmit, based on selecting at least one of the primary carrier or the secondary carrier, a feedback message (e.g., a PUCH message) indicating the acknowledgement information using at least one of the primary carrier or the secondary carrier. The operations of 1520 may be performed according to the methods described herein. In some examples, aspects of the operations of 1520 may be performed by a feedback message manager as described with reference to FIGS. 7 through 10.

Figure 16:
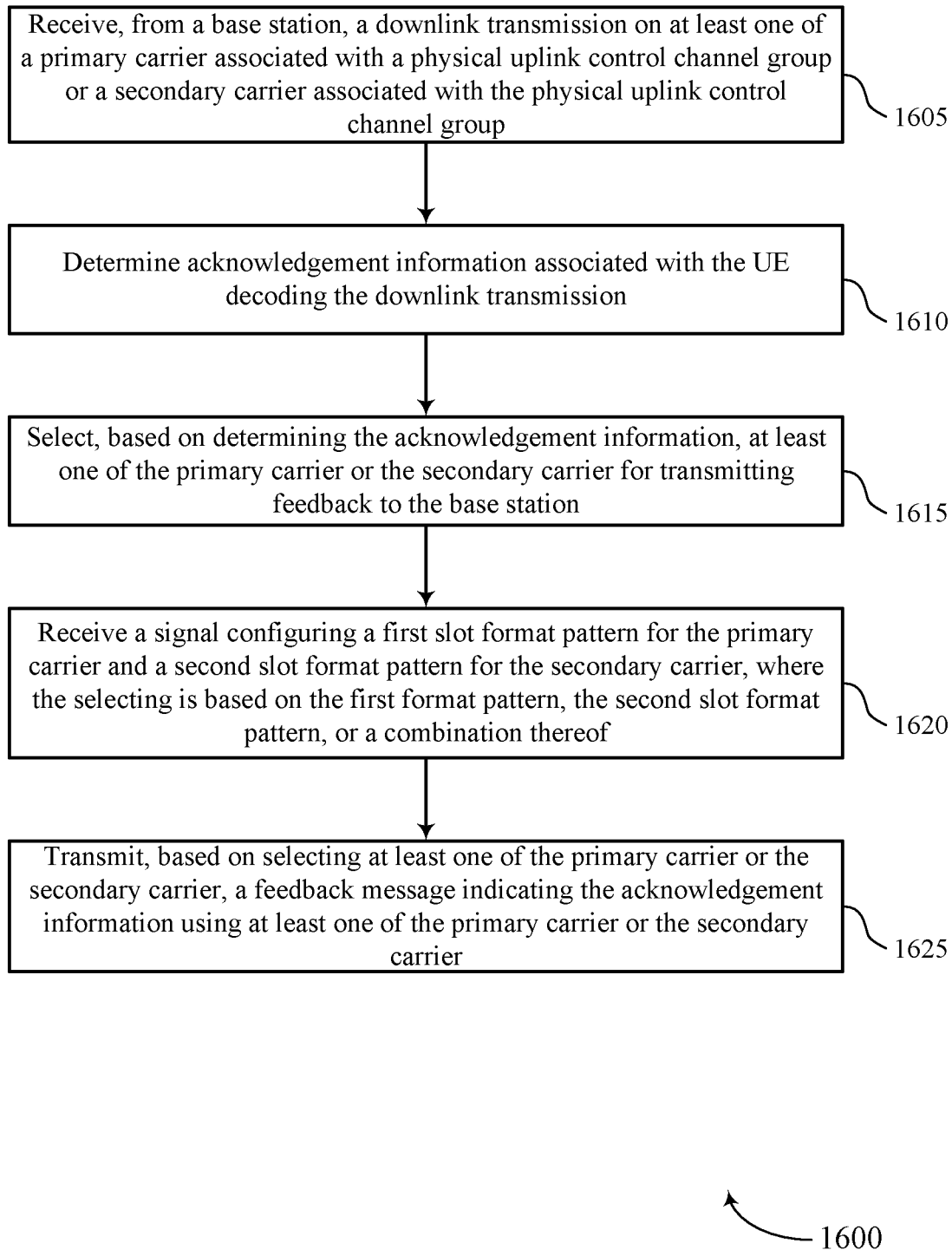

FIG. 16 shows a flowchart illustrating a method 1600 that supports transmit delay sensitive uplink control on secondary carrier in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may optionally receive, from a base station, a downlink transmission on at least one of a primary carrier associated with a PUCCH group or a secondary carrier associated with the PUCCH group. The operations of 1605 may be performed according to the methods described herein. In some examples, aspects of the operations of 1605 may be performed by a DL transmission manager as described with reference to FIGS. 7 through 10.

At 1610, the UE may optionally determine acknowledgement information associated with the UE decoding the downlink transmission. The operations of 1610 may be performed according to the methods described herein. In some examples, aspects of the operations of 1610 may be performed by an acknowledgement information manager as described with reference to FIGS. 7 through 10.

At 1615, the UE may select, based on determining the acknowledgement information, at least one of the primary carrier or the secondary carrier for transmitting feedback to the base station. The operations of 1615 may be performed according to the methods described herein. In some examples, aspects of the operations of 1615 may be performed by a carrier selection manager as described with reference to FIGS. 7 through 10.

At 1620, the UE may receive a signal configuring a first slot format pattern for the primary carrier and a second slot format pattern for the secondary carrier, where the selecting is based on the first slot format pattern, the second slot format pattern, or a combination thereof. The operations of 1620 may be performed according to the methods described herein. In some examples, aspects of the operations of 1620 may be performed by a slot format pattern manager as described with reference to FIGS. 7 through 10.

At 1625, the UE may transmit, based on selecting at least one of the primary carrier or the secondary carrier, a feedback message (e.g., a PUCCH message) indicating the acknowledgement information using at least one of the primary carrier or the secondary carrier. The operations of 1625 may be performed according to the methods described herein. In some examples, aspects of the operations of 1625 may be performed by a feedback message manager as described with reference to FIGS. 7 through 10.

Figure 17:
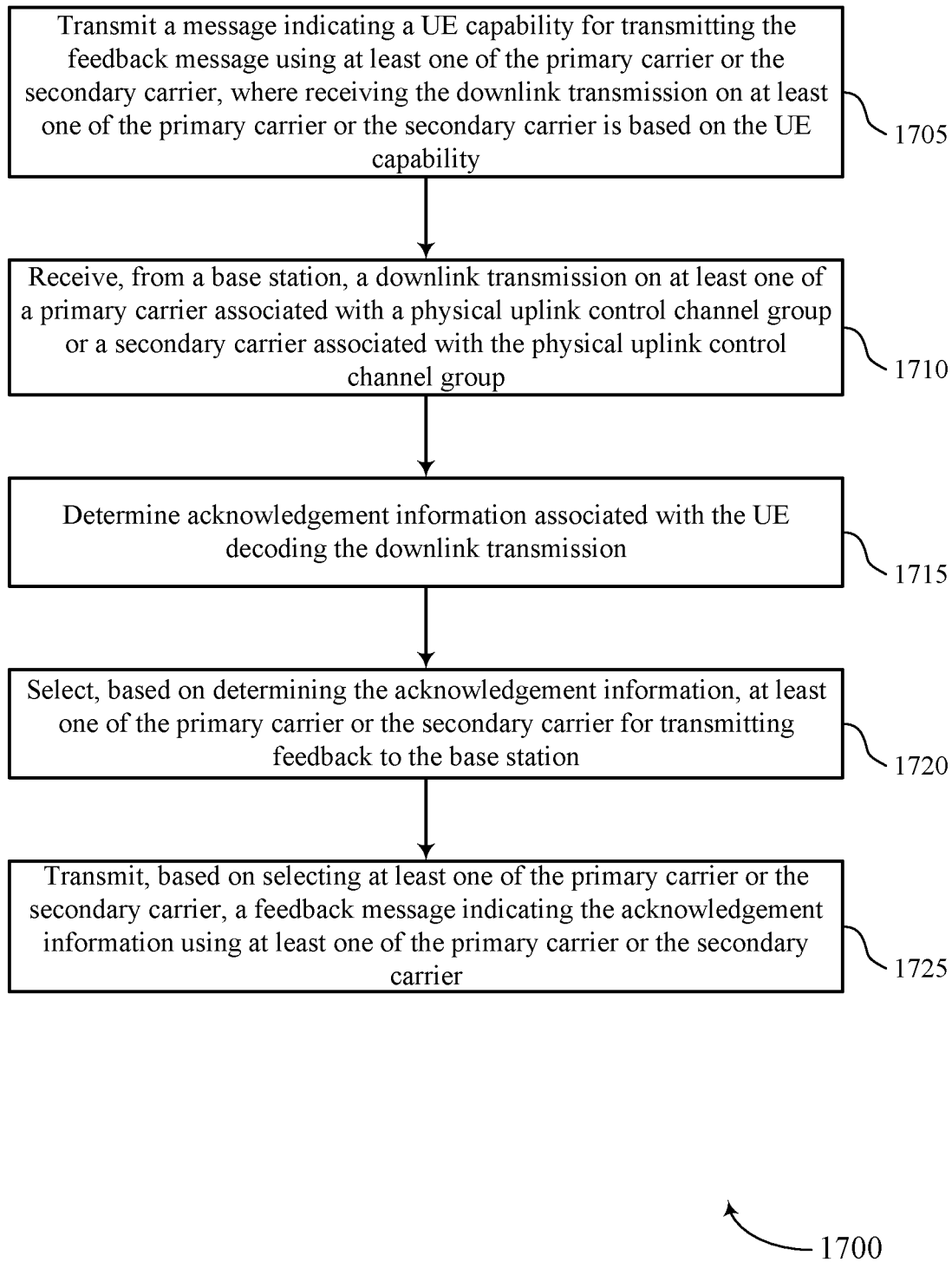

FIG. 17 shows a flowchart illustrating a method 1700 that supports transmit delay sensitive uplink control on secondary carrier in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may transmit a message indicating a UE capability for transmitting the feedback message using at least one of the primary carrier or the secondary carrier, where receiving the downlink transmission on at least one of the primary carrier or the secondary carrier is based on the UE capability. The operations of 1705 may be performed according to the methods described herein. In some examples, aspects of the operations of 1705 may be performed by a UE capability manager as described with reference to FIGS. 7 through 10.

At 1710, the UE may optionally receive, from a base station, a downlink transmission on at least one of a primary carrier associated with a PUCCH group or a secondary carrier associated with the PUCCH group. The operations of 1710 may be performed according to the methods described herein. In some examples, aspects of the operations of 1710 may be performed by a DL transmission manager as described with reference to FIGS. 7 through 10.

At 1715, the UE may determine acknowledgement information associated with the UE decoding the downlink transmission. The operations of 1715 may be performed according to the methods described herein. In some examples, aspects of the operations of 1715 may be performed by an acknowledgement information manager as described with reference to FIGS. 7 through 10.

At 1720, the UE may select, based on determining the acknowledgement information, at least one of the primary carrier or the secondary carrier for transmitting feedback to the base station. The operations of 1720 may be performed according to the methods described herein. In some examples, aspects of the operations of 1720 may be performed by a carrier selection manager as described with reference to FIGS. 7 through 10.

At 1725, the UE may transmit, based on selecting at least one of the primary carrier or the secondary carrier, a feedback message (e.g., a PUCCH message) indicating the acknowledgement information using at least one of the primary carrier or the secondary carrier. The operations of 1725 may be performed according to the methods described herein. In some examples, aspects of the operations of 1725 may be performed by a feedback message manager as described with reference to FIGS. 7 through 10.

Figure 18:
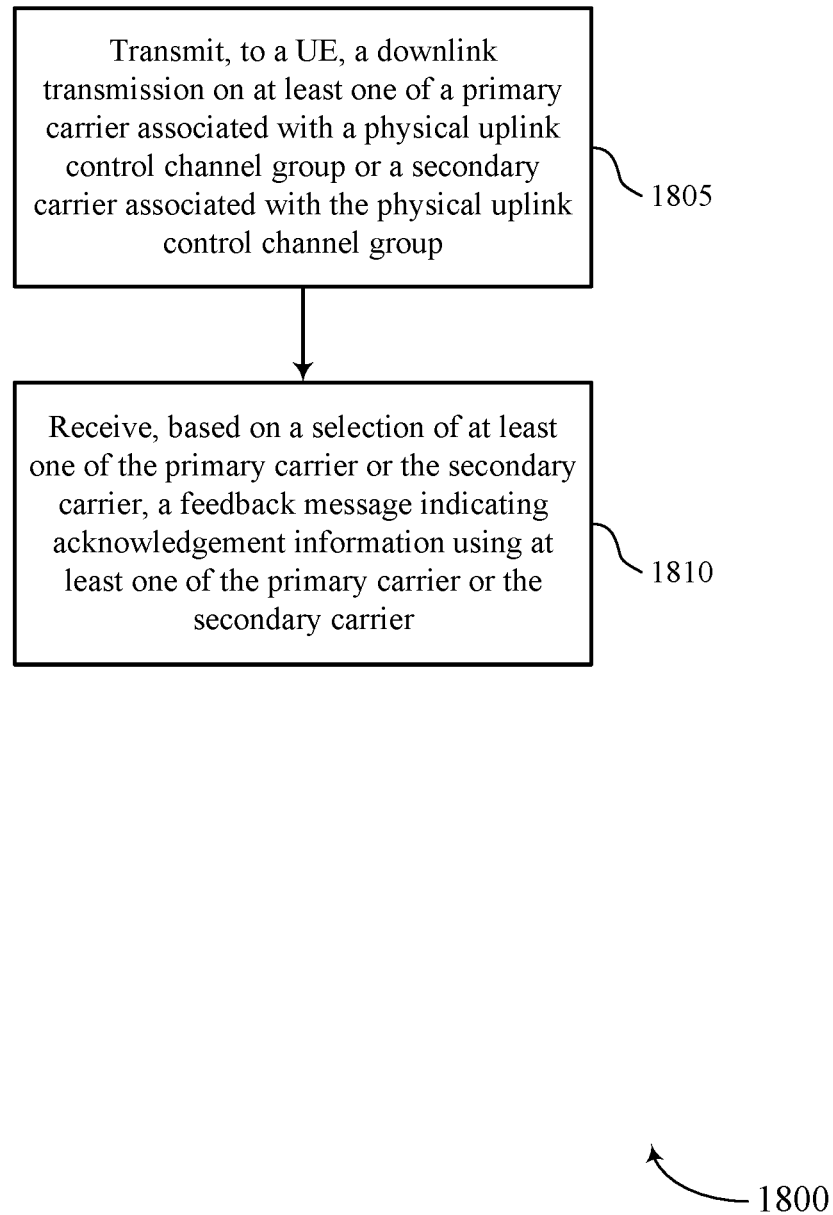

FIG. 18 shows a flowchart illustrating a method 1800 that supports transmit delay sensitive uplink control on secondary carrier in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may optionally transmit, to a UE, a downlink transmission on at least one of a primary carrier associated with a PUCCH group or a secondary carrier associated with the PUCCH group. The operations of 1805 may be performed according to the methods described herein. In some examples, aspects of the operations of 1805 may be performed by a DL transmission manager as described with reference to FIGS. 11 through 14.

At 1810, the base station may receive, based on a selection of at least one of the primary carrier or the secondary carrier, a feedback message (e.g., a PUCCH message) indicating acknowledgement information using at least one of the primary carrier or the secondary carrier. The operations of 1810 may be performed according to the methods described herein. In some examples, aspects of the operations of 1810 may be performed by a feedback message manager as described with reference to FIGS. 11 through 14.

Figure 19:
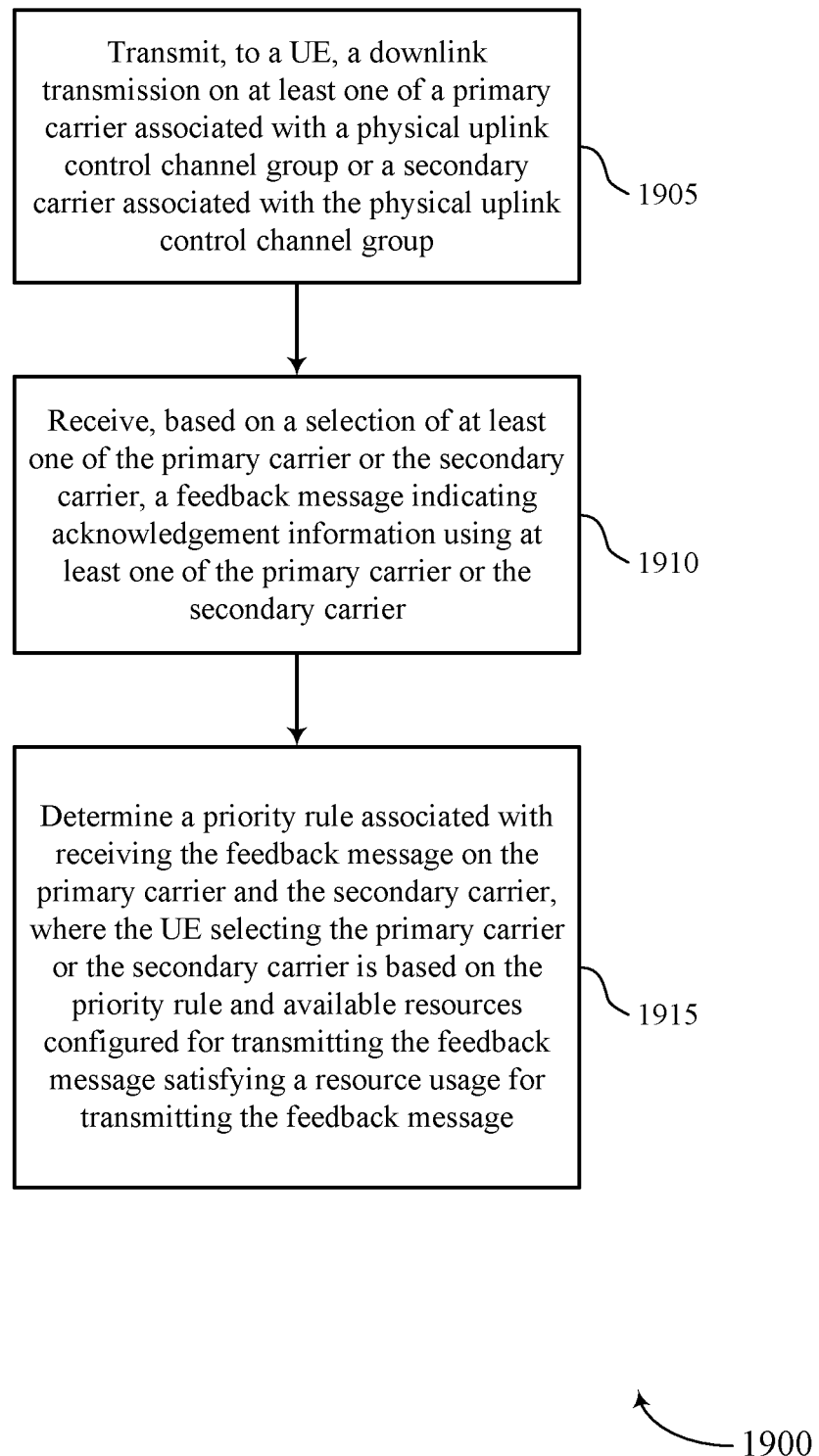

FIG. 19 shows a flowchart illustrating a method 1900 that supports transmit delay sensitive uplink control on secondary carrier in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may optionally transmit, to a UE, a downlink transmission on at least one of a primary carrier associated with a PUCCH group or a secondary carrier associated with the PUCCH group. The operations of 1905 may be performed according to the methods described herein. In some examples, aspects of the operations of 1905 may be performed by a DL transmission manager as described with reference to FIGS. 11 through 14.

At 1910, the base station may receive, based on a selection of at least one of the primary carrier or the secondary carrier, a feedback message (e.g., a PUCCH message) indicating acknowledgement information using at least one of the primary carrier or the secondary carrier. The operations of 1910 may be performed according to the methods described herein. In some examples, aspects of the operations of 1910 may be performed by a feedback message manager as described with reference to FIGS. 11 through 14.

At 1915, the base station may determine a priority rule associated with receiving the feedback message on the primary carrier and the secondary carrier, where the UE selecting the primary carrier or the secondary carrier is based on the priority rule and available resources configured for transmitting the feedback message satisfying a resource usage for transmitting the feedback message. The operations of 1915 may be performed according to the methods described herein. In some examples, aspects of the operations of 1915 may be performed by a priority rule manager as described with reference to FIGS. 11 through 14.

The following provides an overview of aspects of the present disclosure:

Aspect 1: A method for wireless communication at a UE, comprising: selecting at least one of a primary carrier associated with a PUCCH group or a secondary carrier associated with the PUCCH group for transmitting a PUCCH message to a base station; and transmitting, based at least in part on selecting at least one of the primary carrier or the secondary carrier, the PUCCH message to the base station using at least one of the primary carrier or the secondary carrier.

Aspect 2: The method of aspect 1, further comprising: receiving, from a base station, a downlink transmission on at least one of the primary carrier or the secondary carrier; and determining acknowledgement information associated with the UE decoding the downlink transmission, wherein the selecting is based at least in part on the acknowledgement information.

Aspect 3: The method of aspect 2, further comprising: receiving a grant scheduling the downlink transmission and indicating the primary carrier or the secondary carrier for transmitting the PUCCH message, wherein the selecting is based at least in part on the grant.

Aspect 4: The method of any of aspects 1 through 3, further comprising: receiving a signal configuring a first slot format pattern for the primary carrier and a second slot format pattern for the secondary carrier, wherein the selecting is based at least in part on the first format pattern, the second slot format pattern, or a combination thereof.

Aspect 5: The method of aspect 4, wherein the first slot format pattern and the second slot format pattern together comprise staggered instances of uplink slots available for transmitting the PUCCH message in the time domain.

Aspect 6: The method of aspect 5, wherein the staggered instances comprises an uplink slot available on the primary carrier, the secondary carrier, or both, during each slot.

Aspect 7: The method of any of aspects 1 through 6, further comprising: transmitting a message indicating a UE capability for transmitting the PUCCH message using at least one of the primary carrier or the secondary carrier, wherein the selecting the at least one of the primary carrier or the secondary carrier is based at least in part on the UE capability.

Aspect 8: The method of any of aspects 1 through 7, further comprising: receiving a signal configuring a first set of resources for transmitting the PUCCH message on the primary carrier and a second set of resources for transmitting the PUCCH message on the secondary carrier, wherein the selecting is based at least in part on the first set of resources and the second set of resources.

Aspect 9: The method of aspect 8, further comprising: determining a resource usage for transmitting the PUCCH message; and determining available resources in the first set of resources and available resources in the second set of resources, wherein the selecting is based at least in part on the available resources satisfying the resource usage for transmitting the PUCCH message.

Aspect 10: The method of any of aspects 1 through 9, further comprising: determining a priority rule associated with transmitting the PUCCH message on the primary carrier and the secondary carrier, wherein the selecting is based at least in part on the priority rule and available resources configured for transmitting the PUCCH message satisfying a resource usage for transmitting the PUCCH message.

Aspect 11: The method of aspect 10, wherein the priority rule comprises a first priority associated with the primary carrier and a second priority associated with the secondary carrier, the first priority being a higher priority than the second priority.

Aspect 12: The method of any of aspects 10 through 11, wherein the priority rule comprises a second priority associated with the secondary carrier and a third priority associated with an additional secondary carrier, the second priority being a higher priority than the third priority.

Aspect 13: The method of any of aspects 10 through 12, further comprising: receiving a grant activating semi-persistent resources for a downlink transmission and indicating the primary carrier or the secondary carrier for transmitting the PUCCH message, the selecting the at least one of the primary carrier or the secondary carrier to transmit the PUCCH message based at least in part on the grant.

Aspect 14: The method of any of aspects 10 through 13, further comprising: receiving a configuration signal indicating semi-persistent resources for a downlink transmission and indicating the primary carrier or the secondary carrier for transmitting the PUCCH message, the selecting the at least one of the primary carrier or the secondary carrier to transmit the PUCCH message based at least in part on the configuration signal.

Aspect 15: The method of any of aspects 1 through 14, wherein selecting at least one of the primary carrier or the secondary carrier to transmit the PUCCH message comprises: selecting the primary carrier and the secondary carrier for transmitting the PUCCH message.

Aspect 16: The method of aspect 15, wherein transmitting the PUCCH message comprises: transmitting, on the primary carrier, a first PUCCH message using a first codebook generated based at least in part on one or more downlink transmissions received on the primary carrier; and transmitting, on the secondary carrier, a second PUCCH message using a second codebook generated based at least in part on one or more downlink transmissions received on the secondary carrier.

Aspect 17: The method of any of aspects 15 through 16, wherein transmitting the PUCCH message comprises: transmitting, on the primary carrier and the secondary carrier, the PUCCH message using a combined codebook generated based at least in part on one or more downlink transmissions received on the primary carrier and the secondary carrier.

Aspect 18: The method of any of aspects 1 through 17, further comprising: determining that an uplink transmission is scheduled to be transmitted to the base station; determining that a traffic type associated with the uplink transmission is a traffic type supported by the UE for transmission on the secondary carrier; and selecting the secondary carrier for transmission of the uplink transmission based at least in part on the traffic type.

Aspect 19: The method of aspect 18, further comprising: determining that a second uplink transmission is scheduled to be transmitted to the base station; determining that a second traffic type associated with the second uplink transmission is a second traffic type supported by the UE for transmission on the primary carrier; and selecting the primary carrier for transmission of the second uplink transmission based at least in part on the second traffic type.

Aspect 20: The method of aspect 19, wherein the traffic type associated with the uplink transmission comprises an URLLC traffic type, and the second traffic type associated with the second uplink transmission comprises an eMBB traffic type.

Aspect 21: The method of any of aspects 1 through 20, wherein the PUCCH message comprises a first HARQ acknowledgement (HARQ) message associated with a dynamically scheduled downlink transmission, a second HARQ message associated with a semi-persistent activated downlink transmission, a first reference signal measurement report transmission associated with a periodic CSI-RS, a second reference signal measurement report associated with an aperiodic CSI-RS, a third reference signal measurement report associated with a semi-persistent CSI-RS, a SR, or a combination thereof.

Aspect 22: The method of any of aspects 1 through 21, wherein the primary carrier, the secondary carrier, or a combination thereof, each comprise a time-division duplexing carrier, a frequency-division duplexing carrier, or both.

Aspect 23: A method for wireless communication at a base station, comprising: receiving, from a UE and based at least in part on a selection of at least one of a primary carrier associated with a PUCCH group or a secondary carrier associated with the PUCCH group, a PUCCH message using at least one of the primary carrier or the secondary carrier.

Aspect 24: The method of aspect 23, further comprising: transmitting, to the UE, a downlink transmission on at least one of the primary carrier or the secondary carrier, wherein the PUCCH message comprises a feedback message indicating acknowledgement information associated with the UE decoding the downlink transmission.

Aspect 25: The method of aspect 24, further comprising: transmitting a grant scheduling the downlink transmission and indicating the primary carrier or the secondary carrier for transmitting the feedback message.

Aspect 26: The method of any of aspects 23 through 25, further comprising: transmitting a signal configuring a first slot format pattern for the primary carrier and a second slot format pattern for the secondary carrier, wherein receiving the PUCCH message from the UE is based at least in part on the first format pattern, the second slot format pattern, or a combination thereof.

Aspect 27: The method of aspect 26, wherein the first slot format pattern and the second slot format pattern together comprise staggered instances of uplink slots available for transmitting the feedback message in the time domain.

Aspect 28: The method of aspect 27, wherein the staggered instances comprises an uplink slot available on the primary carrier, the secondary carrier, or both, during each slot.

Aspect 29: A method for wireless communication at a UE, comprising: receiving, from a base station, a downlink transmission on at least one of a primary carrier associated with a PUCCH group or a secondary carrier associated with the PUCCH group; determining acknowledgement information associated with the UE decoding the downlink transmission; selecting, based at least in part on determining the acknowledgement information, at least one of the primary carrier or the secondary carrier for transmitting feedback to the base station; and transmitting, based at least in part on selecting at least one of the primary carrier or the secondary carrier, a feedback message indicating the acknowledgement information using at least one of the primary carrier or the secondary carrier.

Aspect 30: The method of aspect 29, further comprising: receiving a signal configuring a first slot format pattern for the primary carrier and a second slot format pattern for the secondary carrier, wherein the selecting is based at least in part on the first format pattern, the second slot format pattern, or a combination thereof.

Aspect 31: The method of aspect 30, wherein the first slot format pattern and the second slot format pattern together comprise staggered instances of uplink slots available for transmitting the feedback message in the time domain.

Aspect 32: The method of any of aspects 30 through 31, further comprising: determining that a grant scheduling the downlink transmission is received a first threshold duration before transmitting the feedback message; and determining that the downlink transmission is received a second threshold duration before transmitting the feedback message, wherein transmitting the feedback message is based at least in part on the first threshold duration and the second threshold duration.

Aspect 33: The method of any of aspects 29 through 32, further comprising: transmitting a message indicating a UE capability for transmitting the feedback message using at least one of the primary carrier or the secondary carrier, wherein receiving the downlink transmission on at least one of the primary carrier or the secondary carrier is based at least in part on the UE capability.

Aspect 34: The method of any of aspects 29 through 33, further comprising: receiving a signal configuring a first set of resources for transmitting the feedback message on the primary carrier and a second set of resources for transmitting the feedback message on the secondary carrier, wherein the selecting is based at least in part on the first set of resources and the second set of resources.

Aspect 35: The method of aspect 34, further comprising: determining a resource usage for transmitting the feedback message; and determining available resources in the first set of resources and available resources in the second set of resources, wherein the selecting is based at least in part on the available resources satisfying the resource usage for transmitting the feedback message.

Aspect 36: The method of any of aspects 29 through 35, further comprising: determining a priority rule associated with transmitting the feedback message on the primary carrier and the secondary carrier, wherein the selecting is based at least in part on the priority rule and available resources configured for transmitting the feedback message satisfying a resource usage for transmitting the feedback message.

Aspect 37: The method of aspect 36, wherein the priority rule comprises a first priority associated with the primary carrier and a second priority associated with the secondary carrier, the first priority being a higher priority than the second priority.

Aspect 38: The method of any of aspects 36 through 37, wherein the priority rule comprises a second priority associated with the secondary carrier and a third priority associated with an additional secondary carrier, the second priority being a higher priority than the third priority.

Aspect 39: The method of any of aspects 36 through 38, further comprising: receiving a grant scheduling the downlink transmission and indicating the primary carrier or the secondary carrier for transmitting the feedback message; and the selecting the at least one of the primary carrier or the secondary carrier to transmit the feedback message based at least in part on the grant.

Aspect 40: The method of any of aspects 36 through 39, further comprising: receiving a grant activating semi-persistent resources for the downlink transmission and indicating the primary carrier or the secondary carrier for transmitting the feedback message; and the selecting the at least one of the primary carrier or the secondary carrier to transmit the feedback message based at least in part on the grant.

Aspect 41: The method of any of aspects 36 through 40, further comprising: receiving a configuration signal indicating semi-persistent resources for the downlink transmission and indicating the primary carrier or the secondary carrier for transmitting the feedback message; and the selecting the at least one of the primary carrier or the secondary carrier to transmit the feedback message based at least in part on the configuration signal.

Aspect 42: The method of any of aspects 29 through 41, wherein selecting at least one of the primary carrier or the secondary carrier to transmit the feedback message comprises: selecting the primary carrier and the secondary carrier for transmitting the feedback message.

Aspect 43: The method of aspect 42, wherein transmitting the feedback message comprises: transmitting, on the primary carrier, a first feedback message using a first codebook generated based at least in part on one or more downlink transmissions received on the primary carrier; and transmitting, on the secondary carrier, a second feedback message using a second codebook generated based at least in part on one or more downlink transmissions received on the secondary carrier.

Aspect 44: The method of any of aspects 42 through 43, wherein transmitting the feedback message comprises: transmitting, on the primary carrier and the secondary carrier, the feedback message using a combined codebook generated based at least in part on one or more downlink transmissions received on the primary carrier and the secondary carrier.

Aspect 45: The method of any of aspects 29 through 44, further comprising: determining that an uplink transmission is scheduled to be transmitted to the base station; determining that a traffic type associated with the uplink transmission is a traffic type supported by the UE for transmission on the secondary carrier; and selecting the secondary carrier for transmission of the uplink transmission based at least in part on the traffic type.

Aspect 46: The method of aspect 45, further comprising: determining that a second uplink transmission is scheduled to be transmitted to the base station; determining that a second traffic type associated with the second uplink transmission is a second traffic type supported by the UE for transmission on the primary carrier; and selecting the primary carrier for transmission of the second uplink transmission based at least in part on the second traffic type.

Aspect 47: The method of aspect 46, wherein the traffic type associated with the uplink transmission comprises an URLLC traffic type, and the second traffic type associated with the second uplink transmission comprises an eMBB traffic type.

Aspect 48: The method of any of aspects 29 through 47, wherein the acknowledgement information comprises at least one of an acknowledgement or a negative acknowledgement.

Aspect 49: The method of any of aspects 29 through 48, wherein the feedback message comprises a HARQ acknowledgement message, a reference signal measurement report transmission, or both.

Aspect 50: The method of any of aspects 29 through 49, wherein the primary carrier, the secondary carrier, or a combination thereof, each comprise a time-division duplexing carrier, a frequency-division duplexing carrier, or both.

Aspect 51: A method for wireless communication at a base station, comprising: transmitting, to a UE, a downlink transmission on at least one of a primary carrier associated with a PUCCH group or a secondary carrier associated with the PUCCH group; and receiving, based at least in part on a selection of at least one of the primary carrier or the secondary carrier, a feedback message indicating acknowledgement information using at least one of the primary carrier or the secondary carrier.

Aspect 52: The method of aspect 51, further comprising: transmitting a signal configuring a first slot format pattern for the primary carrier and a second slot format pattern for the secondary carrier, wherein receiving the feedback message from the UE is based at least in part on the first format pattern, the second slot format pattern, or a combination thereof.

Aspect 53: The method of aspect 52, wherein the first slot format pattern and the second slot format pattern together comprise staggered instances of uplink slots available for transmitting the feedback message in the time domain.

Aspect 54: The method of any of aspects 52 through 53, further comprising: transmitting a grant scheduling the downlink transmission a first threshold duration before the UE transmits the feedback message; and transmitting the downlink transmission a second threshold duration before the UE transmits the feedback message, wherein receiving the feedback message is based at least in part on the first threshold duration and the second threshold duration.

Aspect 55: The method of any of aspects 51 through 54, further comprising: transmitting a signal configuring a first set of resources for transmitting the feedback message on the primary carrier and a second set of resources for transmitting the feedback message on the secondary carrier, wherein the UE selecting the primary carrier or the secondary carrier is based at least in part on the first set of resources and the second set of resources.

Aspect 56: The method of any of aspects 51 through 55, further comprising: receiving a message indicating a UE capability for transmitting the feedback message using at least one of the primary carrier or the secondary carrier, wherein transmitting the downlink transmission on at least one of the primary carrier or the secondary carrier is based at least in part on the UE capability.

Aspect 57: The method of any of aspects 51 through 56, further comprising: determining a priority rule associated with receiving the feedback message on the primary carrier and the secondary carrier, wherein the UE selecting the primary carrier or the secondary carrier is based at least in part on the priority rule and available resources configured for transmitting the feedback message satisfying a resource usage for transmitting the feedback message.

Aspect 58: The method of aspect 57, wherein the priority rule comprises a first priority associated with the primary carrier and a second priority associated with the secondary carrier, the first priority being a higher priority than the second priority.

Aspect 59: The method of any of aspects 57 through 58, wherein the priority rule comprises a second priority associated with the secondary carrier and a third priority associated with an additional secondary carrier, the second priority being a higher priority than the third priority.

Aspect 60: The method of any of aspects 57 through 59, further comprising: transmitting a grant scheduling the downlink transmission and indicating the primary carrier or the secondary carrier for transmitting the feedback message, wherein the grant indicating the primary carrier or the secondary carrier overrides the priority rule for selecting the primary carrier or secondary carrier to transmit the feedback message.

Aspect 61: The method of any of aspects 57 through 60, further comprising: transmitting a grant activating semi-persistent resources for the downlink transmission and indicating the primary carrier or the secondary carrier for transmitting the feedback message, wherein the grant indicating the primary carrier or the secondary carrier overrides the priority rule for selecting the primary carrier or secondary carrier to transmit the feedback message.

Aspect 62: The method of any of aspects 57 through 61, further comprising: transmitting a configuration signal indicating semi-persistent resources for the downlink transmission and indicating the primary carrier or the secondary carrier for transmitting the feedback message, wherein the configuration signal indicating the primary carrier or the secondary carrier overrides the priority rule for selecting the primary carrier or secondary carrier to transmit the feedback message.

Aspect 63: The method of any of aspects 51 through 62, wherein receiving the feedback message comprises: receiving the feedback message on the primary carrier and the secondary carrier.

Aspect 64: The method of aspect 63, wherein receiving the feedback message comprises: receiving, on the primary carrier, a first feedback message using a first codebook generated based at least in part on one or more downlink transmissions transmitted on the primary carrier; and receiving, on the secondary carrier, a second feedback message using a second codebook generated based at least in part on one or more downlink transmissions transmitted on the secondary carrier.

Aspect 65: The method of any of aspects 63 through 64, wherein receiving the feedback message comprises: receiving, on the primary carrier and the secondary carrier, the feedback message using a combined codebook generated based at least in part on one or more downlink transmissions transmitted on the primary carrier and the secondary carrier.

Aspect 66: The method of any of aspects 51 through 65, further comprising: determining that an uplink transmission is scheduled to be transmitted from the UE; determining that a traffic type associated with the uplink transmission is a traffic type supported by the UE for transmission on the secondary carrier; and receiving the uplink transmission on the secondary carrier based at least in part on the traffic type.

Aspect 67: The method of aspect 66, further comprising: determining that a second uplink transmission is scheduled to be transmitted to the base station; determining that a second traffic type associated with the second uplink transmission is a second traffic type supported by the UE for transmission on the primary carrier; and receiving the second uplink transmission on the primary carrier based at least in part on the second traffic type.

Aspect 68: The method of aspect 67, wherein the traffic type associated with the uplink transmission comprises an URLLC traffic type, and the traffic type associated with the uplink transmission comprises an eMBB traffic type.

Aspect 69: The method of any of aspects 51 through 68, wherein the acknowledgement information comprises at least one of an acknowledgement or a negative acknowledgement.

Aspect 70: The method of any of aspects 51 through 69, wherein the feedback message comprises a HARQ acknowledgement message, a reference signal measurement report transmission, or a combination thereof.

Aspect 71: The method of any of aspects 51 through 70, wherein the primary carrier, the secondary carrier, or a combination thereof, each comprise a time-division duplexing carrier, a frequency-division duplexing carrier, or both.

Aspect 72: An apparatus for wireless communication at a UE, comprising a processor; memory coupled with the processor; and instructions stored in the memory and executable by the processor to cause the apparatus to perform a method of any of aspects 1 through 22.

Aspect 73: An apparatus for wireless communication at a UE, comprising at least one means for performing a method of any of aspects 1 through 22.

Aspect 74: A non-transitory computer-readable medium storing code for wireless communication at a UE, the code comprising instructions executable by a processor to perform a method of any of aspects 1 through 22.

Aspect 75: An apparatus for wireless communication at a base station, comprising a processor; memory coupled with the processor; and instructions stored in the memory and executable by the processor to cause the apparatus to perform a method of any of aspects 23 through 28.

Aspect 76: An apparatus for wireless communication at a base station, comprising at least one means for performing a method of any of aspects 23 through 28.

Aspect 77: A non-transitory computer-readable medium storing code for wireless communication at a base station, the code comprising instructions executable by a processor to perform a method of any of aspects 23 through 28.

Aspect 78: An apparatus for wireless communication at a UE, comprising a processor; memory coupled with the processor; and instructions stored in the memory and executable by the processor to cause the apparatus to perform a method of any of aspects 29 through 50.

Aspect 79: An apparatus for wireless communication at a UE, comprising at least one means for performing a method of any of aspects 29 through 50.

Aspect 80: A non-transitory computer-readable medium storing code for wireless communication at a UE, the code comprising instructions executable by a processor to perform a method of any of aspects 29 through 50.

Aspect 81: An apparatus for wireless communication at a base station, comprising a processor; memory coupled with the processor; and instructions stored in the memory and executable by the processor to cause the apparatus to perform a method of any of aspects 51 through 71.

Aspect 82: An apparatus for wireless communication at a base station, comprising at least one means for performing a method of any of aspects 51 through 71.

Aspect 83: A non-transitory computer-readable medium storing code for wireless communication at a base station, the code comprising instructions executable by a processor to perform a method of any of aspects 51 through 71.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

indicating to a base station whether the UE has a capability for transmitting, within a same physical uplink control channel group, a physical uplink control channel message using at least one of a primary carrier associated with the physical uplink control channel group or a secondary carrier associated with the physical uplink control channel group;

selecting at least one of the primary carrier associated with the physical uplink control channel group or the secondary carrier associated with the physical uplink control channel group for transmitting a physical uplink control channel message; and transmitting the physical uplink control channel message to the base station using the at least one of the primary carrier or the secondary carrier, wherein the selecting the at least one of the primary carrier or the secondary carrier is based at least in part on whether the UE has the capability.

2. The method of claim 1, further comprising:
receiving, from a base station, a downlink transmission on at least one of the primary carrier or the secondary carrier; and
determining acknowledgement information associated with the UE decoding the downlink transmission, wherein the selecting is based at least in part on the acknowledgement information.

3. The method of claim 2, further comprising:
receiving a grant scheduling the downlink transmission and indicating the primary carrier or the secondary carrier for transmitting the physical uplink control channel message, wherein the selecting is based at least in part on the grant.

4. The method of claim 1, further comprising:
receiving a signal configuring a first slot format pattern for the primary carrier and a second slot format pattern for the secondary carrier, wherein the selecting is based at least in part on the first format slot pattern, the second slot format pattern, or a combination thereof.

5. The method of claim 4, wherein the first slot format pattern and the second slot format pattern together comprise staggered instances of uplink slots available for transmitting the physical uplink control channel message in the time domain.

6. The method of claim 5, wherein the staggered instances comprises an uplink slot available on the primary carrier, the secondary carrier, or both, during each slot.

7. The method of claim 1, further comprising:
receiving a signal configuring a first set of resources for transmitting the physical uplink control channel message on the primary carrier and a second set of resources for transmitting the physical uplink control channel message on the secondary carrier, wherein the selecting is based at least in part on the first set of resources and the second set of resources.

8. The method of claim 7, further comprising:
determining a resource usage for transmitting the physical uplink control channel message; and
determining available resources in the first set of resources and available resources in the second set of resources, wherein the selecting is based at least in part on the available resources satisfying the resource usage for transmitting the physical uplink control channel message.

9. The method of claim 1, further comprising:
determining a priority rule associated with transmitting the physical uplink control channel message on the primary carrier and the secondary carrier, wherein the selecting is based at least in part on the priority rule and available resources configured for transmitting the physical uplink control channel message satisfying a resource usage for transmitting the physical uplink control channel message.

10. The method of claim 9, wherein the priority rule comprises a first priority associated with the primary carrier and a second priority associated with the secondary carrier, the first priority being a higher priority than the second priority.

11. The method of claim 9, wherein the priority rule comprises a second priority associated with the secondary carrier and a third priority associated with an additional secondary carrier, the second priority being a higher priority than the third priority.

12. The method of claim 9, further comprising:
receiving a grant activating semi-persistent resources for a downlink transmission and indicating the primary carrier or the secondary carrier for transmitting the physical uplink control channel message, the selecting the at least one of the primary carrier or the secondary carrier to transmit the physical uplink control channel message based at least in part on the grant.

13. The method of claim 9, further comprising:
receiving a configuration signal indicating semi-persistent resources for a downlink transmission and indicating the primary carrier or the secondary carrier for transmitting the physical uplink control channel message, the selecting the at least one of the primary carrier or the secondary carrier to transmit the physical uplink control channel message based at least in part on the configuration signal.

14. The method of claim 1, wherein selecting at least one of the primary carrier or the secondary carrier to transmit the physical uplink control channel message comprises:
selecting the primary carrier and the secondary carrier for transmitting the physical uplink control channel message.

15. The method of claim 14, wherein transmitting the physical uplink control channel message comprises:
transmitting, on the primary carrier, a first physical uplink control channel message using a first codebook generated based at least in part on one or more downlink transmissions received on the primary carrier; and
transmitting, on the secondary carrier, a second physical uplink control channel message using a second codebook generated based at least in part on one or more downlink transmissions received on the secondary carrier.

16. The method of claim 14, wherein transmitting the physical uplink control channel message comprises:
transmitting, on the primary carrier and the secondary carrier, the physical uplink control channel message using a combined codebook generated based at least in part on one or more downlink transmissions received on the primary carrier and the secondary carrier.

17. The method of claim 1, further comprising:
determining that an uplink transmission is scheduled to be transmitted to the base station;
determining that a traffic type associated with the uplink transmission is a traffic type supported by the UE for transmission on the secondary carrier; and
selecting the secondary carrier for transmission of the uplink transmission based at least in part on the traffic type.

18. The method of claim 17, further comprising:
determining that a second uplink transmission is scheduled to be transmitted to the base station;

determining that a second traffic type associated with the second uplink transmission is a second traffic type supported by the UE for transmission on the primary carrier; and selecting the primary carrier for transmission of the second uplink transmission based at least in part on the second traffic type.

19. The method of claim 18, wherein the traffic type associated with the uplink transmission comprises an ultra-reliable/low-latency communication (URLLC) traffic type, and wherein the second traffic type associated with the second uplink transmission comprises an enhanced mobile broadband (eMBB) traffic type.

20. The method of claim 1, wherein the physical uplink control channel message comprises a first hybrid automatic repeat/request acknowledgement (HARQ) message associated with a dynamically scheduled downlink transmission, a second HARQ message associated with a semi-persistent activated downlink transmission, a first reference signal measurement report transmission associated with a periodic channel state information reference signal (CSI-RS), a second reference signal measurement report associated with an aperiodic CSI-RS, a third reference signal measurement report associated with a semi-persistent CSI-RS, a scheduling request, or a combination thereof.

21. The method of claim 1, wherein the primary carrier, the secondary carrier, or a combination thereof, each comprise a time-division duplexing carrier, a frequency-division duplexing carrier, or both.

22. The method of claim 1, further comprising:
receiving signaling from the base station that enables transmission of the uplink control channel message on the secondary carrier based at least on part on the UE having the capability.

23. A method for wireless communication at a base station, comprising:
receiving, from a user equipment (UE), a message indicating whether the UE has a capability for transmitting, within a same physical uplink control channel group, a physical uplink control channel message using at least one of a primary carrier associated with the physical uplink control channel group or a secondary carrier associated with the physical uplink control channel group;
receiving, from the UE and based at least in part on a selection by the UE of at least one of the primary carrier associated with the physical uplink control channel group or the secondary carrier associated with the physical uplink control channel group, a physical uplink control channel message using at least one of the primary carrier or the secondary carrier.

24. The method of claim 23, further comprising:
transmitting, to the UE, a downlink transmission on at least one of the primary carrier or the secondary carrier, wherein the physical uplink control channel message comprises a feedback message indicating acknowledgement information associated with the UE decoding the downlink transmission.

25. The method of claim 24, further comprising:
transmitting a grant scheduling the downlink transmission and indicating the primary carrier or the secondary carrier for transmitting the feedback message.

26. The method of claim 23, further comprising:
transmitting a signal configuring a first slot format pattern for the primary carrier and a second slot format pattern for the secondary carrier, wherein receiving the physical uplink control channel message from the UE is based at least in part on the first slot format pattern, the second slot format pattern, or a combination thereof.

27. The method of claim 26, wherein the first slot format pattern and the second slot format pattern together comprise staggered instances of uplink slots available for transmitting the feedback message in the time domain.

28. The method of claim 27, wherein the staggered instances comprises an uplink slot available on the primary carrier, the secondary carrier, or both, during each slot.

29. An apparatus for wireless communication at a user equipment (UE), comprising:
a processor,
memory coupled with the processor; and
instructions stored in the memory and executable by the processor to cause the apparatus to:
indicate to a base station whether the UE has a capability for transmitting, within a same physical uplink control channel group, a physical uplink control channel message using at least one of a primary carrier associated with the physical uplink control channel group or a secondary carrier associated with the physical uplink control channel group;
select at least one of the primary carrier associated with the physical uplink control channel group or the secondary carrier associated with a physical uplink control channel group for transmitting a physical uplink control channel message; and
transmit the physical uplink control channel message to the base station using at least one of the primary carrier or the secondary carrier,
wherein the selecting the at least one of the primary carrier or the secondary carrier is based at least in part on whether the UE has the capability.

30. An apparatus for wireless communication at a base station, comprising:
a processor,
memory coupled with the processor; and
instructions stored in the memory and executable by the processor to cause the apparatus to:
receiving, from a user equipment (UE), a message indicating whether the UE has a capability for transmitting, within a same physical uplink control channel group, a physical uplink control channel message using at least one of a primary carrier associated with the physical uplink control channel group or a secondary carrier associated with the physical uplink control channel group;
receive, from the UE and based at least in part on a selection by the UE of at least one of the primary carrier associated with the physical uplink control channel group or the secondary carrier associated with the physical uplink control channel group, a physical uplink control channel message using at least one of the primary carrier or the secondary carrier.

* * * * *